United States Patent
von Langsdorff et al.

(10) Patent No.: US 10,494,770 B2
(45) Date of Patent: Dec. 3, 2019

(54) PAVING ELEMENT HAVING DRAINAGE CHANNELS AND PAVEMENT SYSTEM INCORPORATING SAME

(71) Applicant: F. von Langsdorff Licensing Limited, Caledon (CA)

(72) Inventors: Harald von Langsdorff, Caledon (CA); William James, Guelph (CA)

(73) Assignee: F. von Langsdorff Licensing Limited, Caledon (CA)

(*) Notice: Subject to any disclaimer, the term of this patent is extended or adjusted under 35 U.S.C. 154(b) by 0 days.

(21) Appl. No.: 15/776,767

(22) PCT Filed: Nov. 17, 2016

(86) PCT No.: PCT/CA2016/051345
§ 371 (c)(1),
(2) Date: May 16, 2018

(87) PCT Pub. No.: WO2017/083977
PCT Pub. Date: May 26, 2017

(65) Prior Publication Data
US 2018/0327978 A1    Nov. 15, 2018

Related U.S. Application Data

(60) Provisional application No. 62/382,758, filed on Sep. 1, 2016, provisional application No. 62/256,471, filed on Nov. 17, 2015.

(51) Int. Cl.
*E01C 5/00* (2006.01)
*B01D 24/04* (2006.01)
*B01D 24/46* (2006.01)

(52) U.S. Cl.
CPC ............... *E01C 5/00* (2013.01); *B01D 24/04* (2013.01); *B01D 24/46* (2013.01); *E01C 5/005* (2013.01);
(Continued)

(58) Field of Classification Search
CPC .......... E01C 5/00; E01C 5/005; E01C 11/225; E01C 2201/02; E01C 2201/06;
(Continued)

(56) References Cited

U.S. PATENT DOCUMENTS 1,024,276 A    4/1912  Nash
1,686,757 A    10/1928 Loughridge
(Continued)

FOREIGN PATENT DOCUMENTS

CN    204715139 U    10/2015
DE    3707649 U1     7/1987
(Continued)

OTHER PUBLICATIONS

Canadian Intellectual Property Office, International Search Report, PCT/CA2016/051345, dated Jan. 24, 2017.
(Continued)

*Primary Examiner* — Raymond W Addie
(74) *Attorney, Agent, or Firm* — Cahn & Samuels, LLP

(57) ABSTRACT

A paving element includes upper and lower surfaces and one or more drainage channels extending through the paving element between the upper and lower surfaces. The drainage channels include a substantially concave or cupule shaped upper portion, provided on the upper surface of the paving element, and a channel from the concave portion through to the lower surface of the bottom surface of the paving element. The drainage channels can be complete, when provided in the interior of the paving element, or partial, when provided along the sides or perimeter of the paving element. The partial channels are completed when the paving element is placed adjacent another paving element when forming a pavement. The drainage channels are adapted to facilitate the cleaning process of the channels.

20 Claims, 38 Drawing Sheets

(52) U.S. Cl.
CPC ...... *B01D 2101/04* (2013.01); *E01C 2201/16* (2013.01); *E01C 2201/20* (2013.01)

(58) Field of Classification Search
CPC . E01C 2201/16; E01C 2201/20; B01D 24/04; B01D 24/46; B01D 2101/04; Y02A 30/32
USPC ...................................... 404/34, 36
See application file for complete search history.

(56) References Cited

U.S. PATENT DOCUMENTS

| | | | |
|---|---|---|---|
| 1,727,362 A | 9/1929 | Bone | |
| 2,530,940 A | 11/1950 | Dahlin | |
| 3,421,417 A | 1/1969 | Pilaar | |
| 3,903,702 A | 9/1975 | Appleton | |
| 3,923,410 A | 12/1975 | Jordan et al. | |
| 3,943,589 A * | 3/1976 | Pedersen | E01C 5/16 14/69.5 |
| 4,834,575 A | 5/1989 | Barth et al. | |
| 4,997,308 A | 3/1991 | Welling, Jr. | |
| 5,046,887 A * | 9/1991 | Fontana | E01C 5/00 404/34 |
| 5,342,142 A | 8/1994 | Barth et al. | |
| 5,360,285 A | 11/1994 | Barth et al. | |
| 5,645,369 A * | 7/1997 | Geiger | E01C 5/06 404/34 |
| 5,797,698 A | 8/1998 | Barth et al. | |
| 5,902,069 A | 5/1999 | Barth et al. | |
| 6,337,025 B1 * | 1/2002 | Clemenson | B01J 20/22 210/163 |
| 6,857,244 B2 | 2/2005 | Schmitz | |
| 6,939,077 B1 * | 9/2005 | Hart | E01C 5/00 404/39 |
| 6,942,420 B1 | 9/2005 | Drost et al. | |
| 8,683,769 B2 * | 4/2014 | Cerny | E01C 5/001 404/36 |
| 8,696,241 B2 * | 4/2014 | Lee | E01C 13/083 405/39 |
| 8,790,037 B2 * | 7/2014 | Culleton | E01C 5/22 404/29 |
| 2007/0269265 A1 * | 11/2007 | Thorkelson | E01C 5/18 404/34 |
| 2010/0150654 A1 * | 6/2010 | Shaw et al. | E01C 11/18 405/50 |
| 2011/0091275 A1 * | 4/2011 | Lindenbaum | C04B 26/006 404/34 |

FOREIGN PATENT DOCUMENTS

| | | | |
|---|---|---|---|
| DE | 20102145 U1 | 7/2001 | |
| DE | 102011010163 A1 | 9/2011 | |
| EP | 1024226 A1 | 8/2000 | |
| EP | 2650435 A2 | 10/2013 | |
| GB | 2103262 A * | 3/1982 | ............... E01C 9/00 |
| WO | 9738168 A1 | 10/1997 | |
| WO | 2006080042 A1 | 8/2006 | |

OTHER PUBLICATIONS

Canadian Intellectual Property Office, International Preliminary Report on Patentability, PCT/CA2016/051345, dated Feb. 5, 2018.
Canadian Intellectual Property Office, Written Opinion, PCT/CA2016/051345, dated Jan. 24, 2017.
European Patent Office, English abstract of CN204715139, printed on May 21, 2018.
European Patent Office, English abstract of EP1024226, printed on May 21, 2018.
The Extended European Search Report for Application No. 16865356.6, dated Jun. 13, 2019, pp. 1-4, 1-3 (pp. 1-8).
European Patent Office, English Abstract of DE102011010163 A1, printed on Aug. 6, 2019.
European Patent Office, English Abstract of EP2650435 A2, printed on Aug. 6, 2019.

* cited by examiner

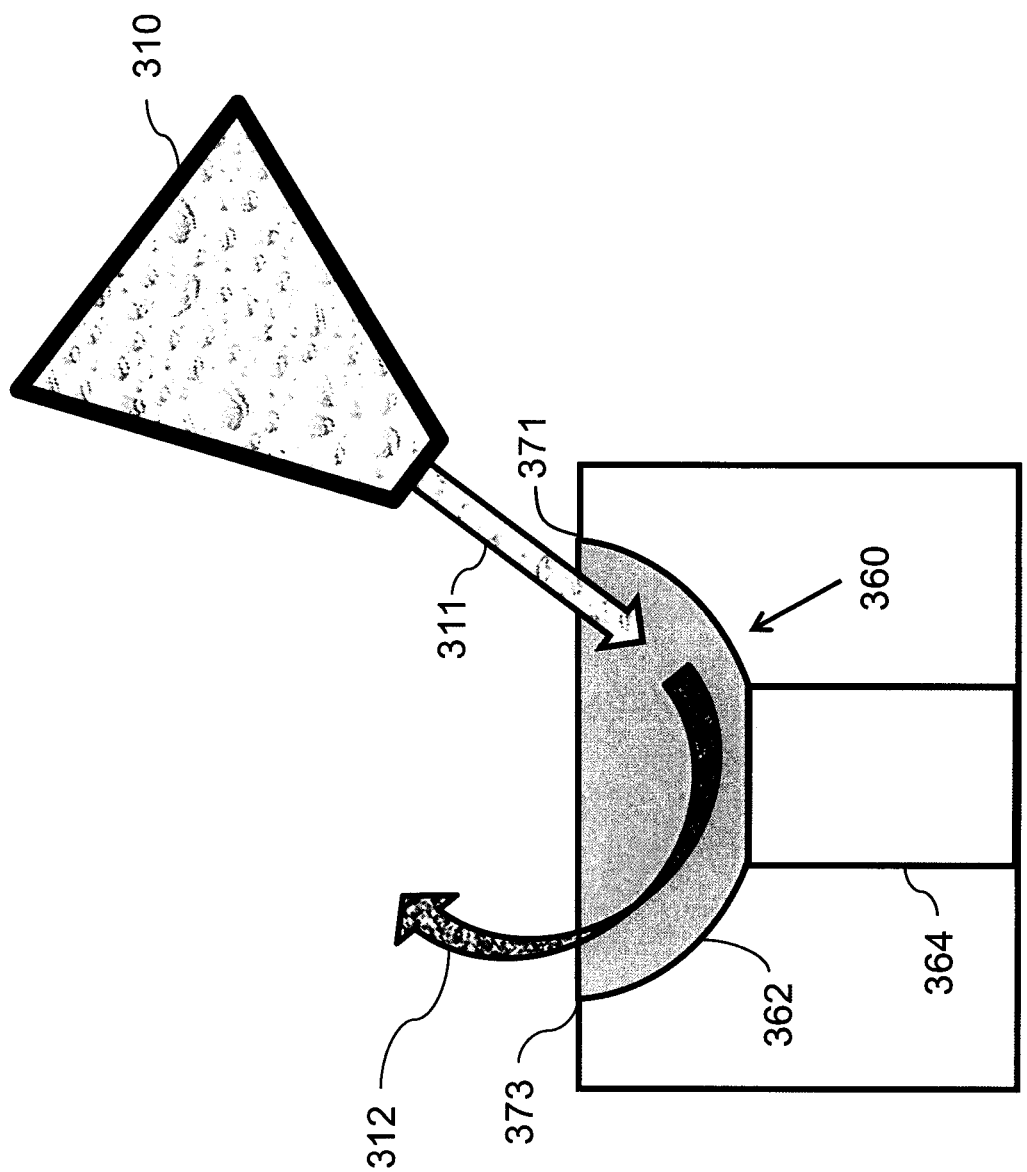

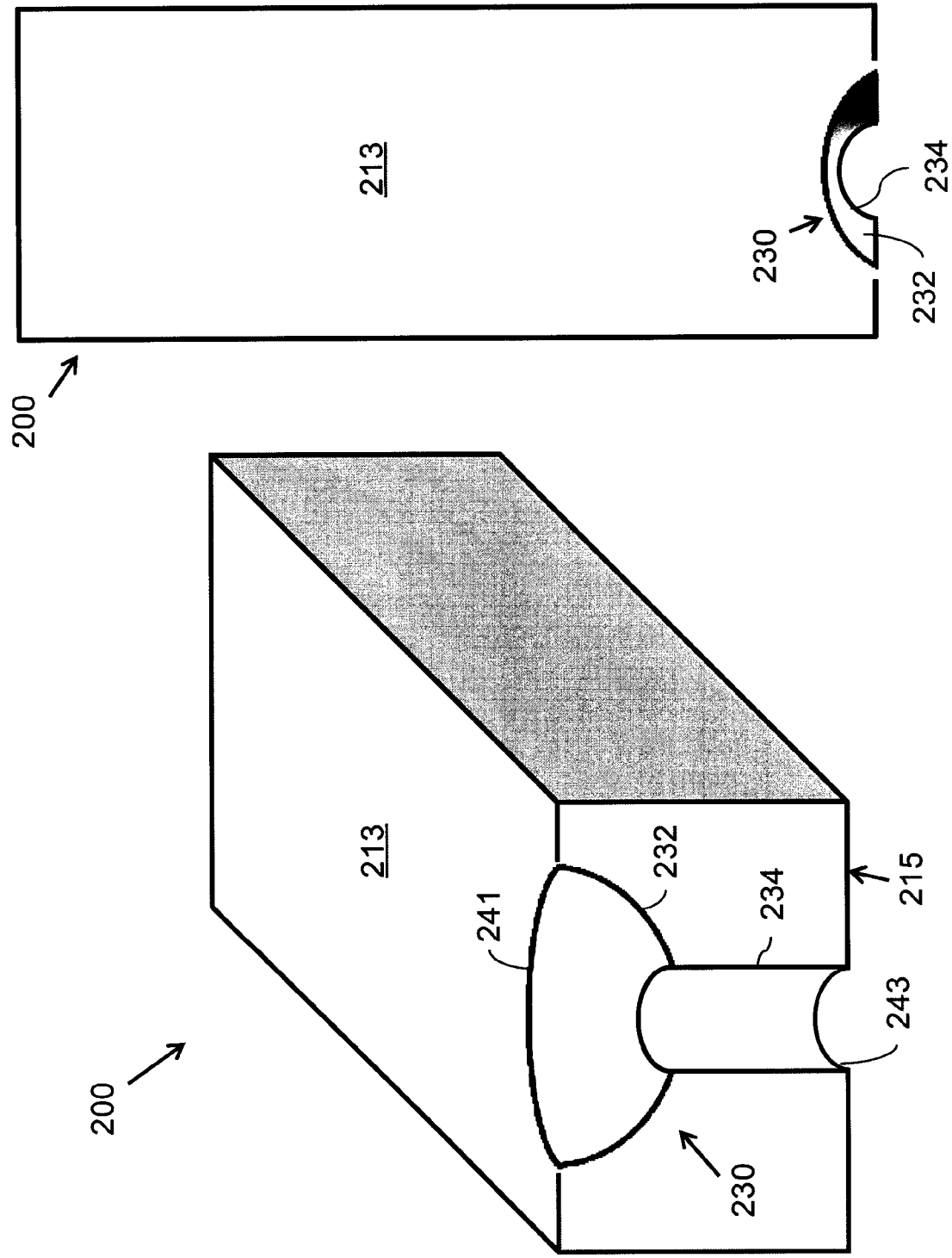

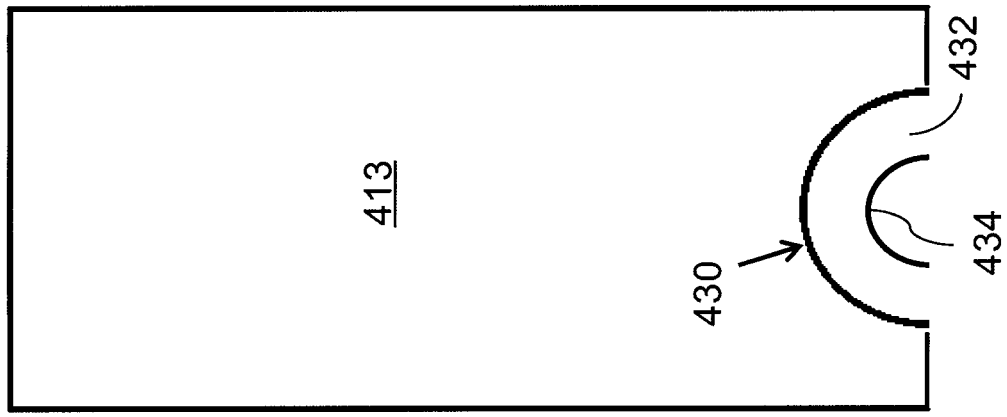
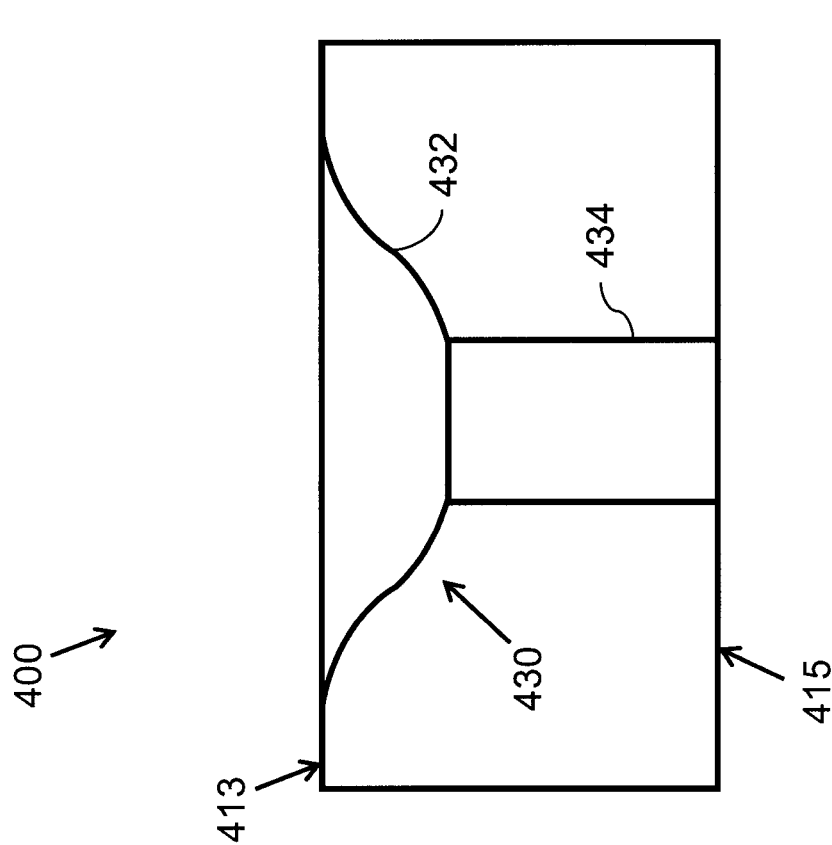

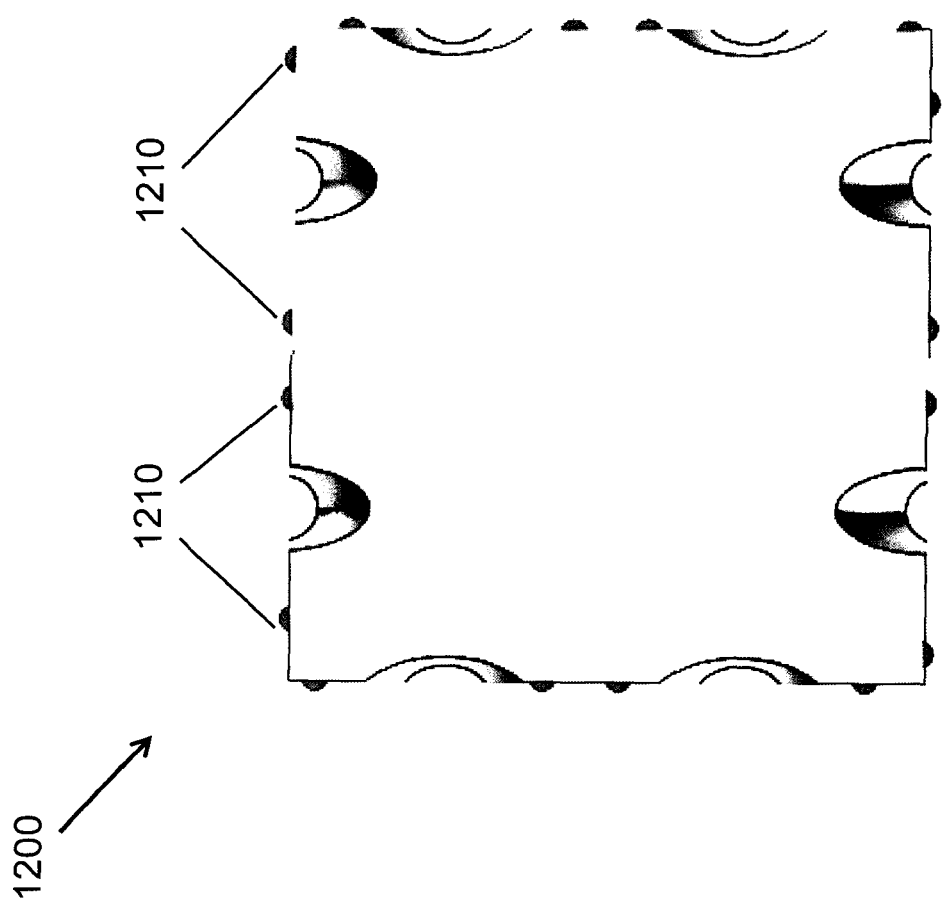

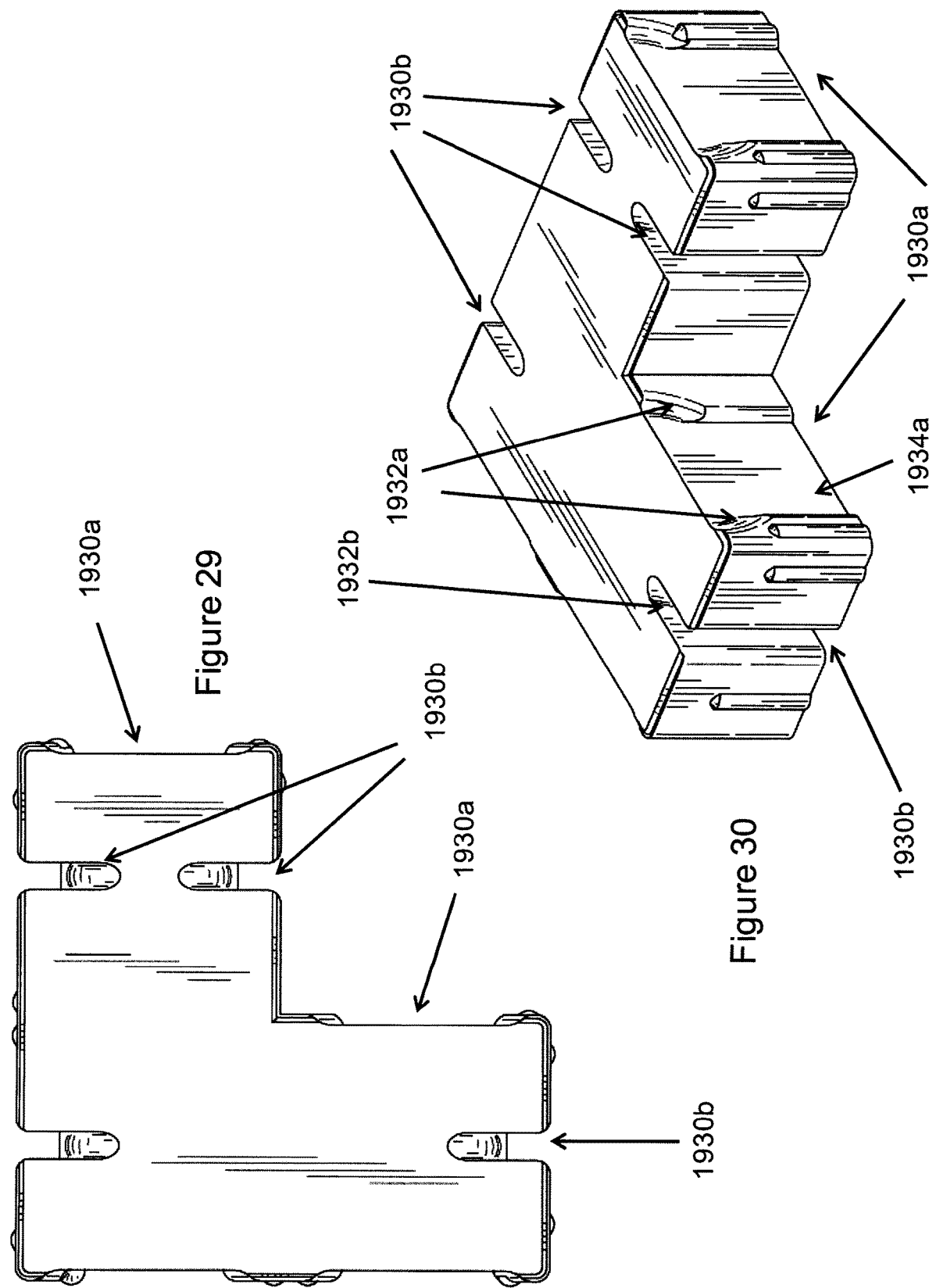

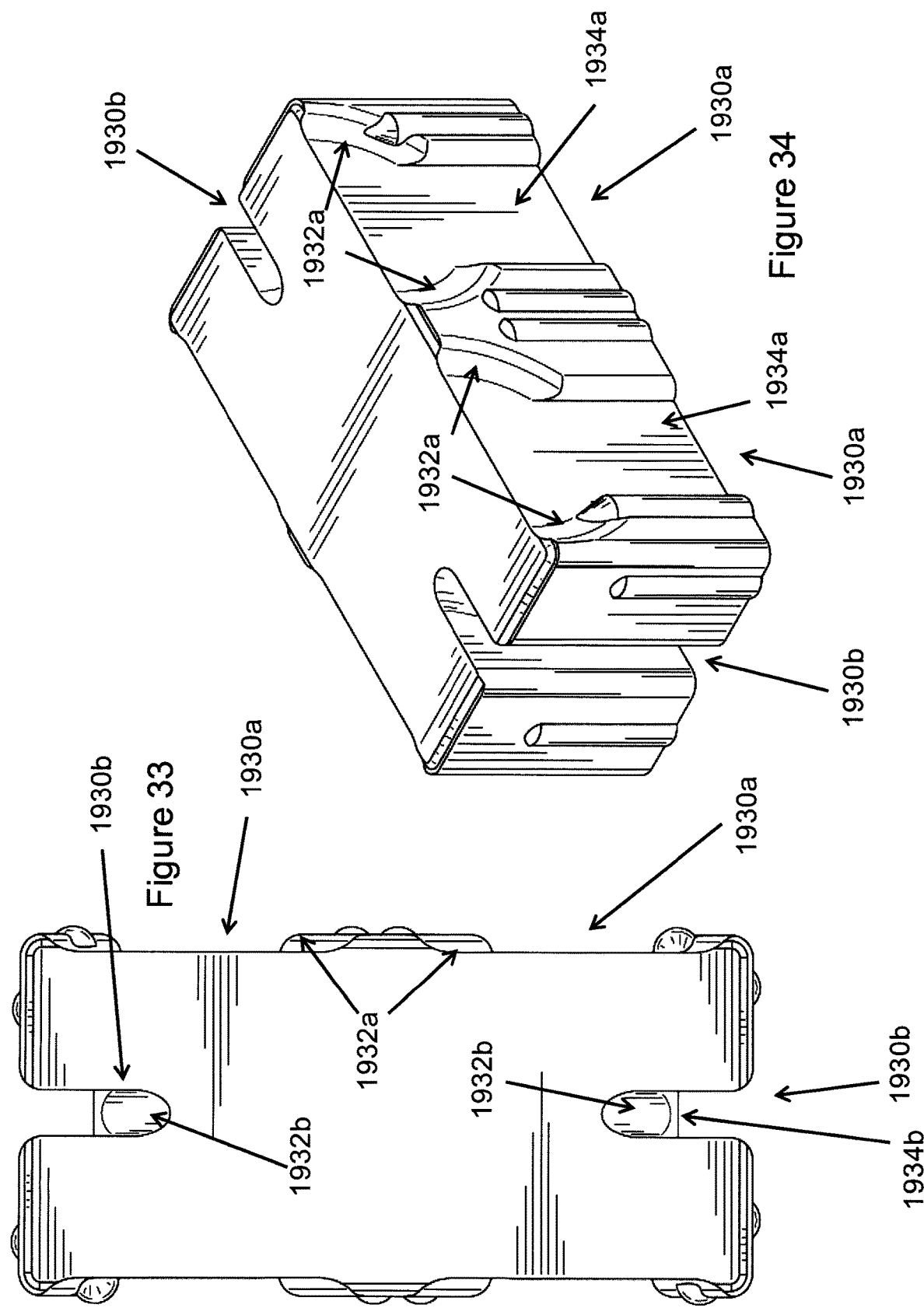

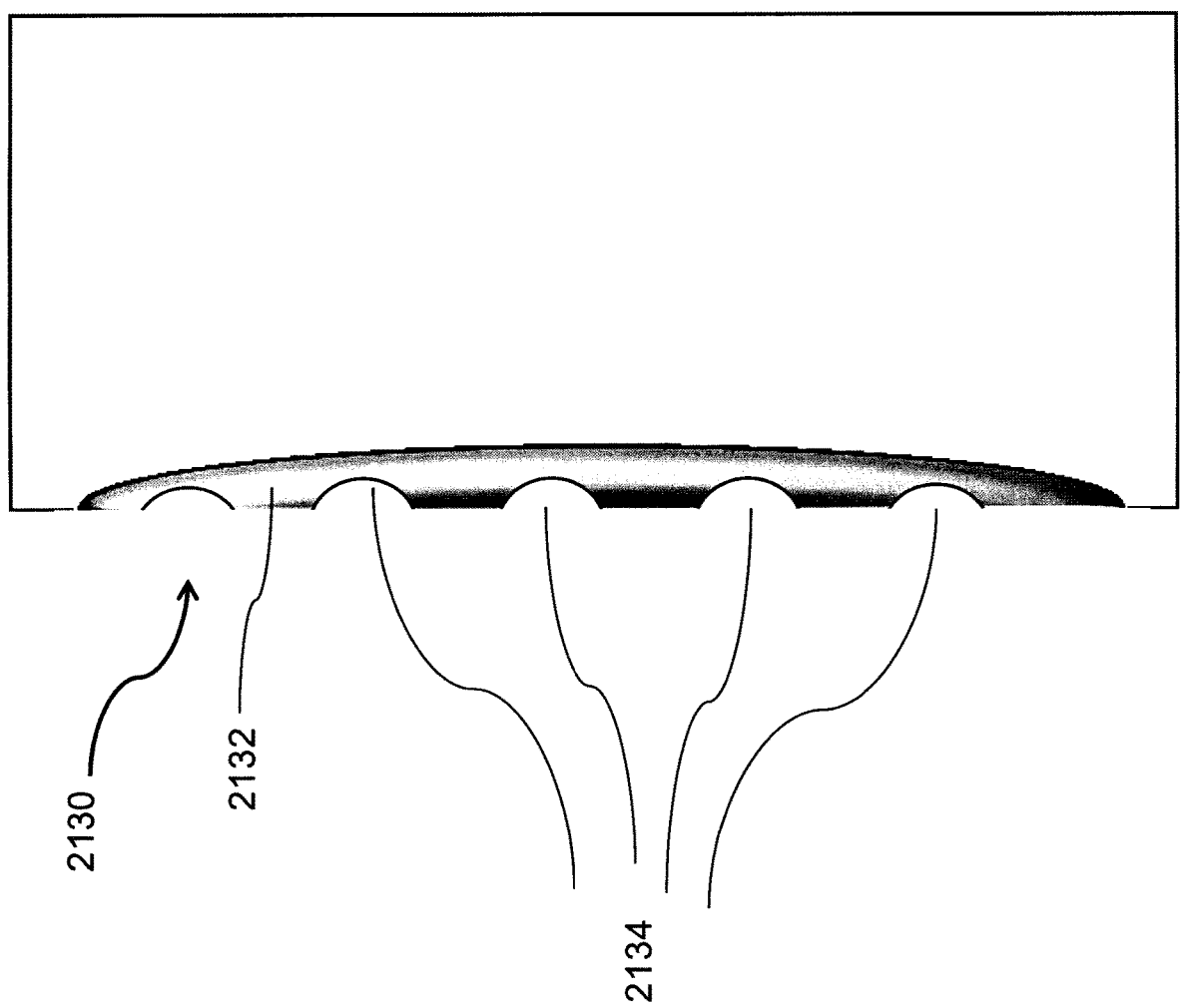

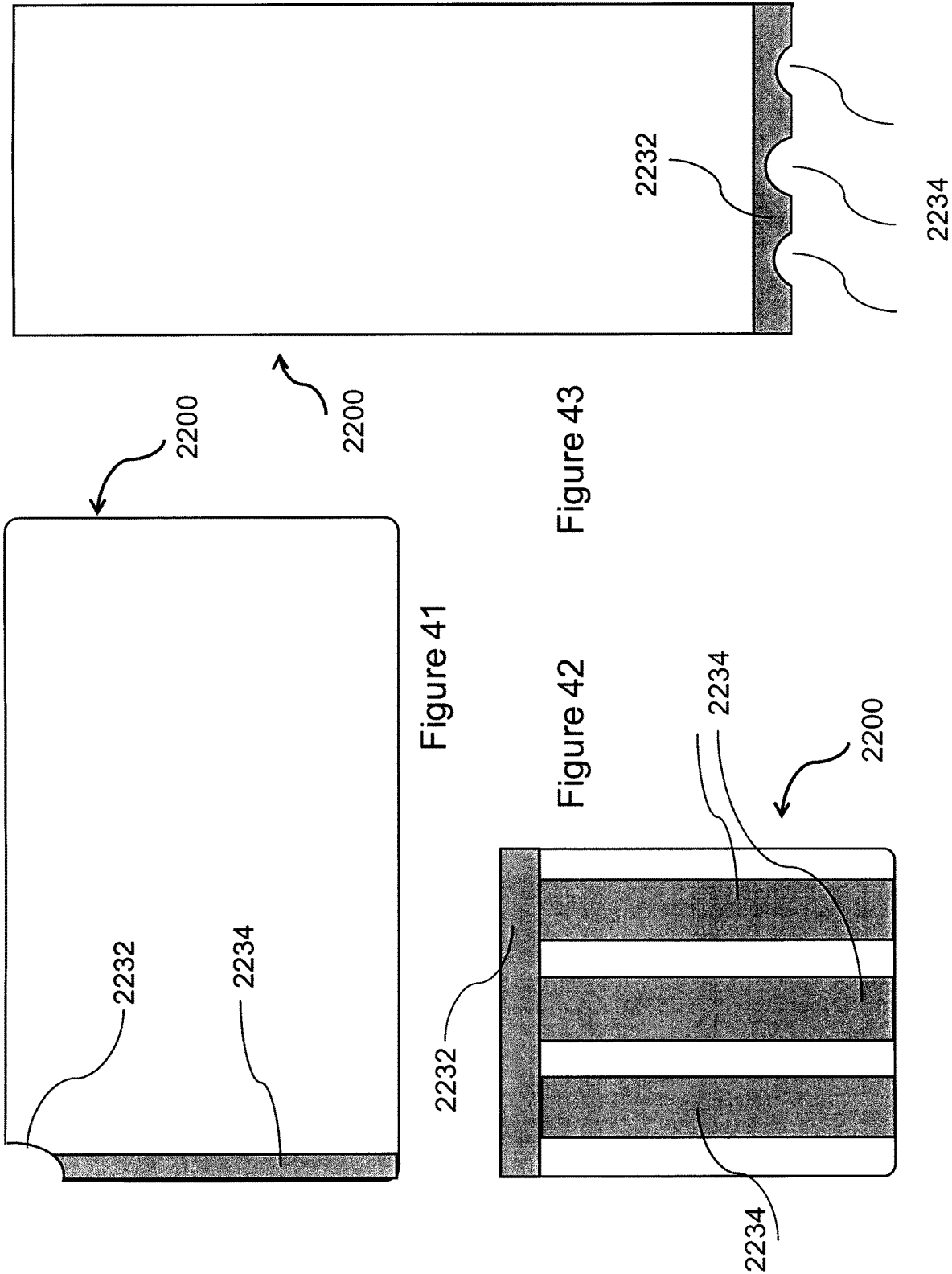

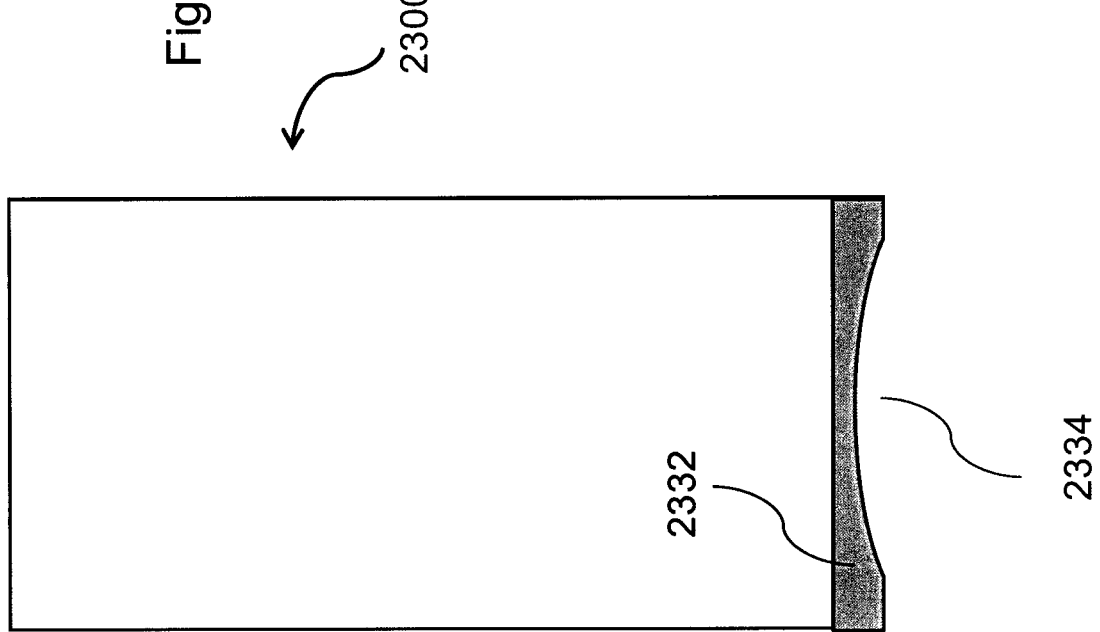

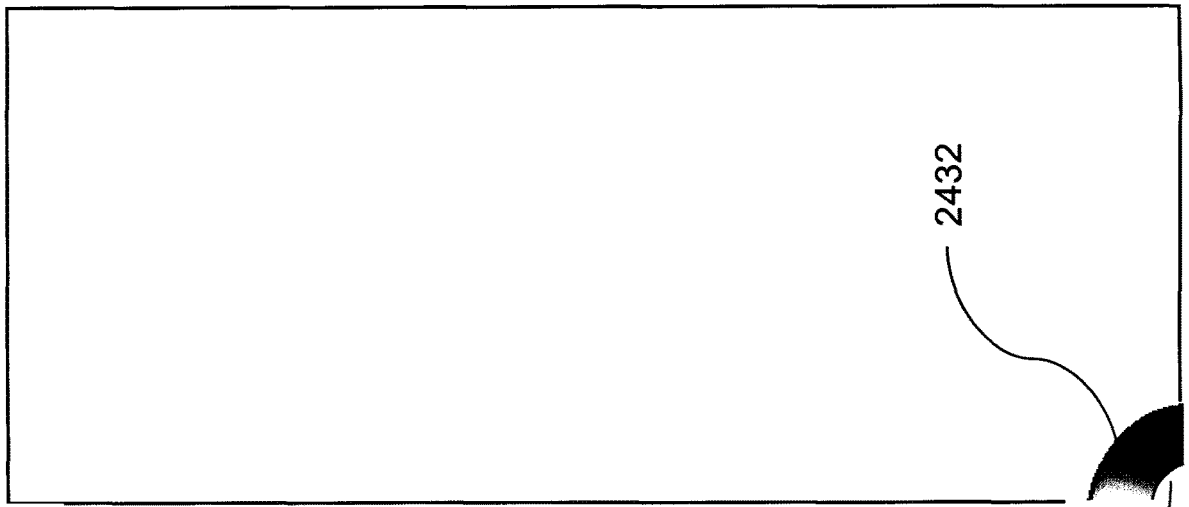
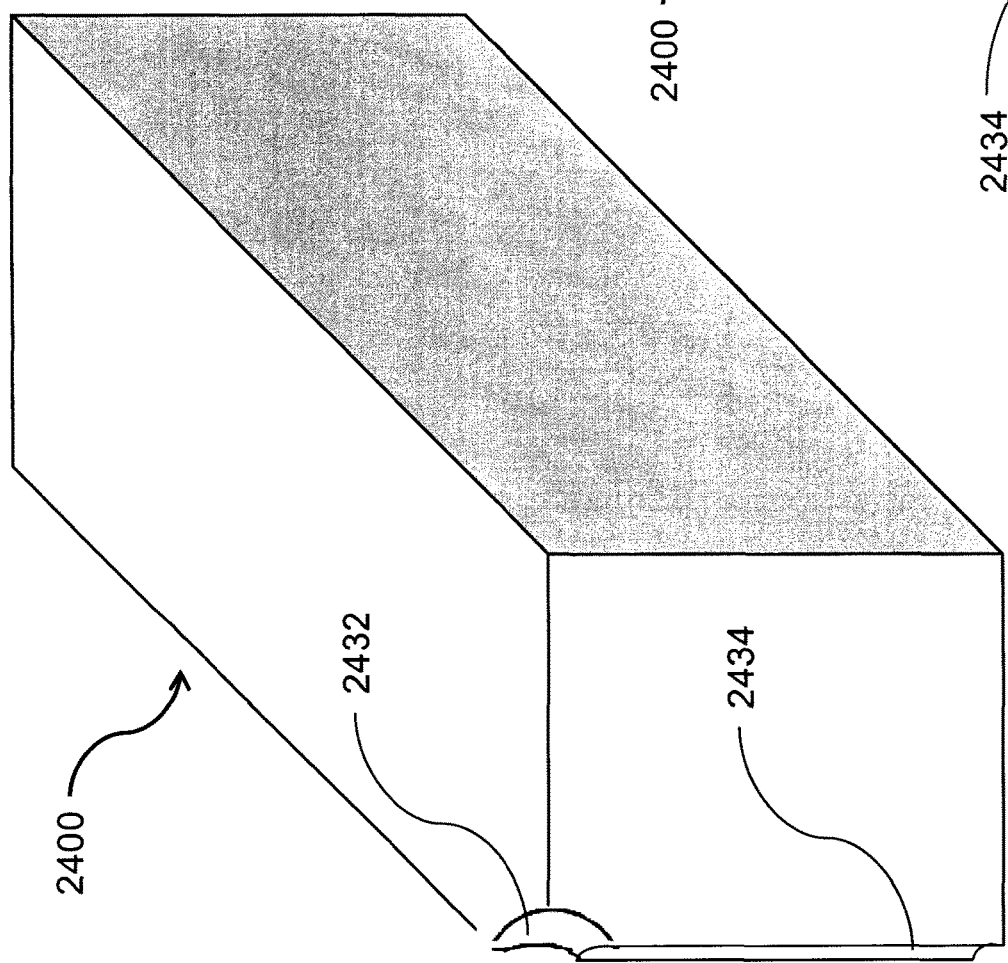

PAVING ELEMENT HAVING DRAINAGE CHANNELS AND PAVEMENT SYSTEM INCORPORATING SAME

FIELD OF THE DESCRIPTION

The following relates generally to paving elements and pavement systems for providing drainage and filtration of liquids on a paved surface. In particular, the following relates to paving elements and systems adapted to facilitate removal of spent filter media from a paved surface.

BACKGROUND

Various types of paving stones or paving elements for use in creating a paved surface are known in the art. In particular, paving stones for creating a paved surface having drainage cavities or holes formed therein are known. Generally, such drainage cavities are provided to prevent liquids (e.g. water) from pooling on the paved surface by allowing passage of such liquids there-through.

Some attempts have also been made at providing filtering of liquids being drained through the drainage cavities. Filtering is provided, for example, by providing a filter media within the drainage cavities such that the liquid being drained through the drainage cavity is filtered by the filter media. In this way, various contaminants which may be present in the drainage liquid, such as oil, particulates and other chemicals, are retained by the filter media. Filtration of the drainage liquid is generally desirable for the purposes of reducing the amount of contaminants reaching the groundwater and soil beneath the paved surface, as well as any receiving waters that the drainage liquid may be discharged into.

For example, U.S. Pat. No. 5,342,142 to Barth et al. describes an angular paving stone having a number of recesses. The recesses are configured such that when the paving stones are laid, full recesses are formed by the recesses of the adjacent stones complementing each other. The full recesses allow water to be discharged from a paved surface into the layer underneath. Barth describes that the full recesses may be filled with a suitable filling material such as sand, fine gravel, fine chips or the like, and that any "filling material plugs" which may form over time can be swept away using, for example, a motor sweeper. However, the full recesses formed by laying the paving stones are not described as being configured to facilitate cleaning of the recesses by means other than by sweeping. Furthermore, it has been found that the filling material generally cannot be easily removed from the recesses, since attempting to remove such material can result in the filling material being pushed deeper into the recesses in some cases, as further described below.

In another example, U.S. Pat. No. 4,834,575 to Barth et al. describes a paving stone for forming a paved surface by laying similarly configured paving stones adjacent to one another, in which there is a free space created between adjacent paving stones for discharging water. In one aspect, the paving stone is described as including a protrusion having a chamfered upper face that slopes downwardly, such that when neighbouring paving stones are laid adjacent to each another, the corresponding protrusions of the stones face each other to create the free space there-between. While it is described that the free space may be filled with water permeable filling material such as fine grained gravel, the paving stones are not specifically configured to allow such filling material to be readily removed once the filling material becomes contaminated or otherwise accumulates pollutants.

U.S. Pat. No. 4,997,308 to Welling, Jr. describes a paving stone having four angled corners and a central hole. The edges of the upper surface of the paving stone are described as being chamfered. The central hole is described as being provided for the purpose of facilitating handling of the paving stones among other purposes. However, the central hole is not described as being configured to be filled with any material which acts as a filter media.

For pavement systems that incorporate drainage cavities and/or filter media, a problem has been the challenge of maintaining the infiltration capacity, i.e. the volume of water able to be captured and treated by the system. Whether planning, designing, constructing and/or managing a permeable pavement installation, it is fundamentally important to provide and maintain surface infiltration capacity. However, studies have consistently shown reductions in infiltration capacities as such pavement systems age, due to clogging of the filter media with organic and chemical particulates such as heavy metals, nutrients, sediment and organic matter. Furthermore, studies have shown that employing conventional street cleaners with such systems resulted in limited restoration in infiltration capacity. If the infiltration capacity of a pavement system cannot be substantially restored by cleaning methods, it is inevitable that the infiltration capacity will decrease with age until the system is no longer able to capture and treat water effectively.

Accordingly, there remains a need for a paving element and a system that addresses at least one of the deficiencies known in the art.

SUMMARY OF THE DESCRIPTION

In one aspect, there is provided a paving element comprising a plurality of drainage channels that are adapted to be cleaned in an efficient manner.

In one aspect, there is provided a paving element comprising an upper surface, a lower surface and a side wall, the paving element further comprising a plurality of drainage channels extending through the element between the upper and lower surfaces, wherein each of the drainage channels includes a first opening, provided on the upper surface of the paving element, and in some aspects a second opening, provided on the lower surface of the paving element, the first opening comprising a concave or an apex-down triangular portion formed on the upper surface of the paving element. An apex-down triangular shape will be referred to herein as "concave".

In one aspect, the drainage channels of the paving elements are provided on the perimeter and/or the interior thereof. When provided on the perimeter, the drainage channels are partial drainage channels formed into the side wall of the paving element, wherein the complete channels are formed when two or more paving elements with partial channels are placed adjacent to each other such as to form pavement.

In another aspect, a pavement system is provided, comprising a plurality of paving stones as described herein. The pavement formed with such paving elements would include a plurality of drainage channels, each of which includes a concave opening on the upper surface.

In one aspect, each of the paving elements having partial drainage channels provided on the perimeter thereof, that is, formed into the side walls of the paving elements, whereby, when the paving elements are laid on a surface, the adjacent partial drainage channels combine to form a complete drainage channel.

BRIEF DESCRIPTION OF THE DRAWINGS

The features of the invention will become more apparent in the following detailed description in which reference is made to the appended drawings wherein:

FIG. 5A is a schematic diagram illustrating a process of removing a filter media from the drainage cavity according to one aspect.

FIG. 7 is a perspective view of a paving element according to another aspect.

FIG. 8 is a plan view of the paving element of FIG. 7.

FIG. 9A is an end elevation view of a paving element according to yet another aspect.

FIG. 9B is a plan view of the paving element of FIG. 9A.

FIG. 22 is a plan view illustrating a paving element according to another aspect.

FIG. 29 is a plan view of a paving element according to another aspect.

FIG. 30 is a side perspective view of the paving element shown in FIG. 29.

FIG. 33 is a plan view of a paving element according to another aspect.

FIG. 34 is a side perspective view of the paving element shown in FIG. 33.

FIG. 40 is a plan view of another aspect of a paving element.

FIG. 41 is a side elevation of another aspect of a paving element.

FIG. 42 is a front elevation of the paving element of FIG. 41.

FIG. 43 is a plan view of the paving element of FIG. 41.

FIG. 44 is a plan view of another aspect of a paving element.

FIG. 45 is a front perspective view of another aspect of a paving element.

FIG. 46 a plan view of the paving element of FIG. 45.

DETAILED DESCRIPTION

As used herein, the term "substantially concave" or "generally concave" will be understood to mean that a portion of a cavity is formed by a curved or straight surface that generally flares away from a low point in the concavity. As further described below, the term "concave" or "concave portion" would be understood to mean a "cupule" as illustrated in the accompanying figures.

The term "partial cavity" will be understood to mean a cavity which is adapted to be positioned adjacent to a corresponding partial cavity to cooperatively form a drainage cavity. For example, the corresponding partial cavity may have a mirrored profile of the partial cavity. In contrast, the term "full cavity" will be understood to mean a cavity which is adapted to independently form a complete drainage cavity.

The terms "comprise", "comprises", "comprised" or "comprising" may be used in the present specification. As used herein (including the description and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

The term "paving element" will be understood to mean a paving stone or paving block etc., which is used in combination with other paving elements to form pavement. This may include a parking lot, a driveway, a roadway, a sidewalk or any other such surface as would be known to persons skilled in the art. The terms "paving element" and "paving stone" may be used interchangeably in the present description.

The terms "upper" and "lower" are used in the present description in reference to the orientation of the paving element when laid on a surface to form a pavement. Thus, when in used to form paved surface, the lower surface of the paving element would rest on the ground or other supporting surface (typically one or more layers of a granular material, as would be known in the art). The upper surface would face away from the ground.

In one aspect, a paving element is provided. The paving element generally comprises an upper surface and a lower surface and formed with a number of full and/or partial drainage channels. The full or partial drainage channels comprise a generally concave, or cupule shaped upper portion and, in one aspect, a lower portion, or channel or conduit extending from the cupule through the paving element and opening into the lower surface of the paving element for allowing passage of liquid through the paving element.

Figure 1:
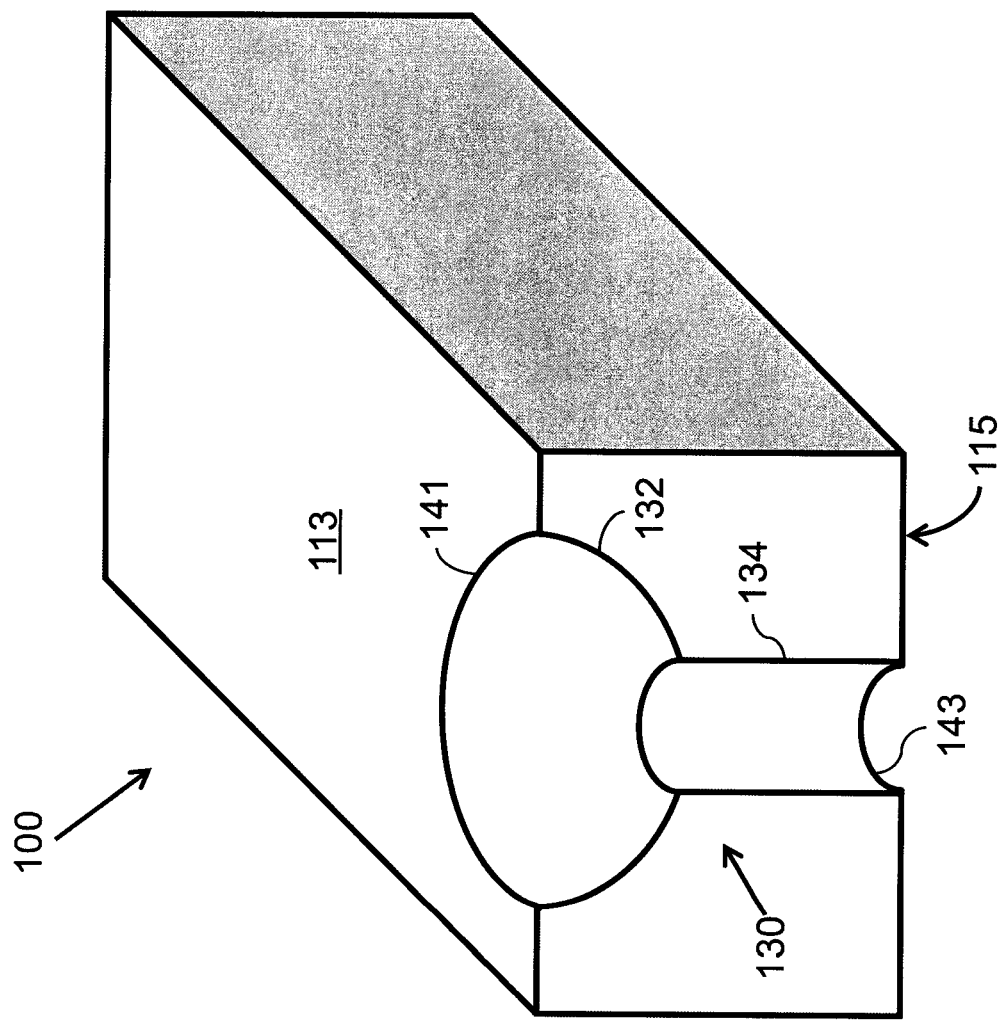
FIG. 1 is a perspective view of a paving element according to one aspect.

FIG. 1 illustrates a paving block 100 having an upper surface 113 and a lower surface 115 according to one aspect. The paving block 100 is also illustrated as having a partial cavity 130 formed therein. The partial cavity 130 is illustrated as being a partial cavity extending between an upper orifice or opening 141 formed on the upper surface 113 and a lower orifice or opening 143 formed on the lower surface 115. The partial cavity 130 comprises an upper, generally concave or cupule portion 132 located proximal to the upper surface 113 and a lower portion, or conduit or channel 134 extending generally from the base of the cupule 132, through the paving block thereby forming a channel extending through to the lower orifice or opening 143 located proximal to the lower surface 115. As illustrated, the upper portion or cupule 132 has a generally concave shape as illustrated by a curved surface 100. It will be appreciated, and as discussed further herein, that the shape of the cupule 132 or the conduit 134 is not intended to be limited by the accompanying figures. The shapes shown in the figures are only intended to illustrate the general characteristics of the features of the subject paving element.

Figure 3:
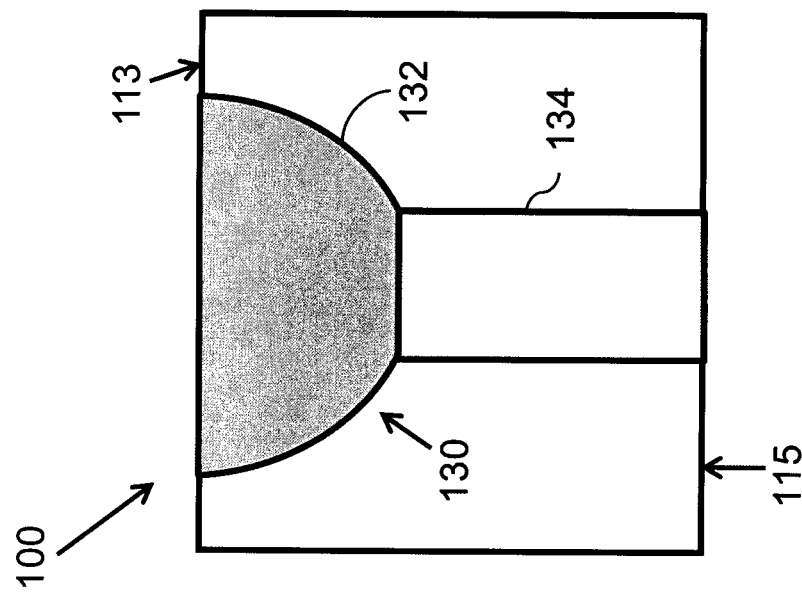
FIG. 3 is an end elevation view of the paving element of FIG. 1.
Figure 2:
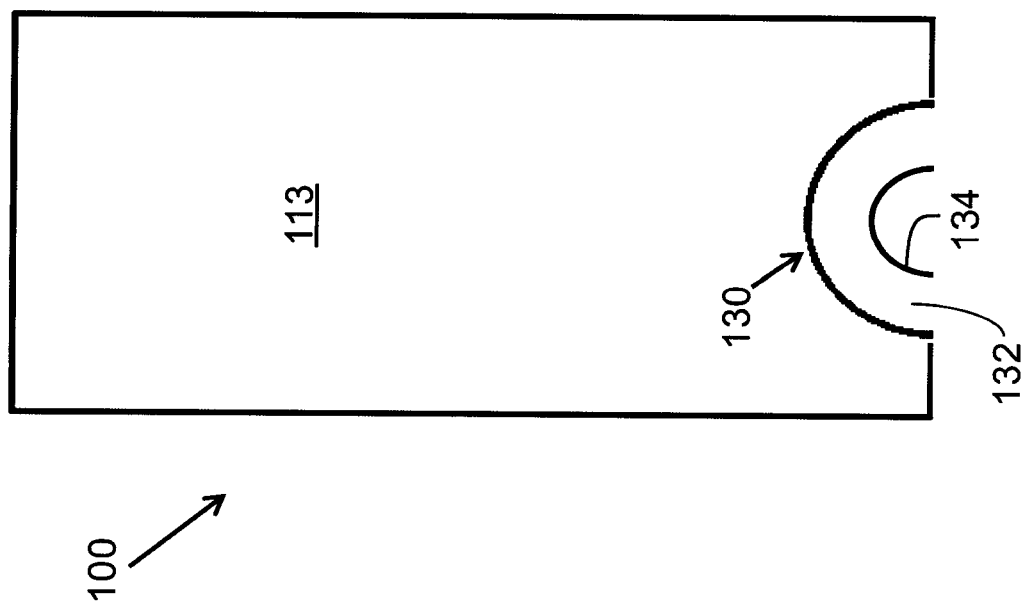
FIG. 2 is a plan view of the paving element of FIG. 1.

In the example shown in FIG. 1, both the top orifice 141 and the bottom orifice 143 are semicircular in shape. This is further illustrated in FIGS. 2 and 3, which respectively show the plan view and the end elevation of the paving element 100.

Figure 4:
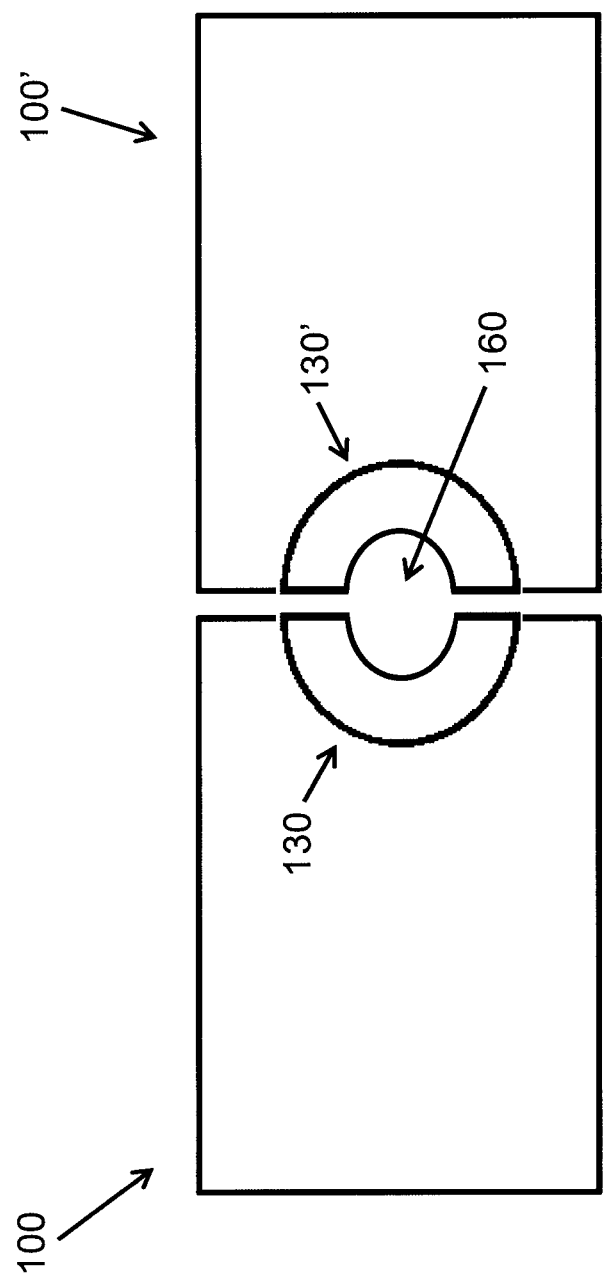
FIG. 4 is a plan view illustrating two paving elements forming a drainage cavity according to one aspect.

FIG. 4 illustrates two identical paving elements 100, 100' being laid adjacent to one another to form a drainage cavity 160 according to one aspect. As shown in FIG. 4, a first paving element 100 is laid adjacent to a second paving element 100', such that the partial cavity 130 of the first paving element 100 and the corresponding partial cavity 130' of the second paving element 100' cooperatively form the drainage cavity 160. As will be understood, the top and bottom orifice of the drainage cavity 160 formed by joining two semicircular partial cavities 130, 130' together would be substantially circular in shape, as illustrated in FIG. 4. Furthermore, it would be appreciated that since each of the partial cavities 130, 130' include an upper concave portion and a lower portion defined by a channel, the drainage cavity 160 would include a "bowl-shaped" or "cup-shaped" upper portion (also referred to as the "cupule" or "concavity") and a tubular bottom portion (also referred to as the "conduit"). By laying a plurality of paving elements in the manner described above, a paved surface having a plurality of drainage cavities may be formed.

In another aspect, a pavement system is provided. The pavement system comprises a plurality of paving elements, as described herein, positioned adjacent to one another. Each paving element comprises an upper surface and a lower surface, and a full or partial cavity formed in the paving element. The full or partial cavity further comprises an upper cupule and a lower channel extending to the lower surface for allowing passage of liquid through the paving element. In such system, the plurality of paving elements are positioned adjacent to one another to provide a paved surface having a plurality of drainage cavities formed by the full or partial cavities.

The drainage cavities may be filled with filter media, such that liquid (e.g. water) drained through the drainage cavities is filtered. For example, the filter media may comprise gravel, sand, and various aggregates which may be treated or untreated. The presence of such filter media generally reduces the amount of pollutants and various contaminants, including particulates, reaching the soil or other layer beneath the paved surface, since these pollutants and contaminants are filtered out to produce a residue which is retained by the filter media. As a result of the filtration process, the filtered liquid (i.e. the filtrate) is "cleaner" than the original liquid and thus may be discharged into the soil or ground beneath the paved surface, or drained into a collection device or the like.

Over time, the filter media disposed within the drainage cavities may become spent or encrusted due to the accumulation of the retentate (e.g. pollutants and contaminants). In order to replenish the filter media, a cleaning apparatus may be used to remove the spent filter media and refill the drainage cavities with a new or regenerated filter media.

According to one aspect, the cleaning apparatus is configured to remove the filter media and any residue by directing a stream of pressurized fluid(s) into the drainage cavities. Specifically, the cleaning apparatus may include a jet which is configured to direct a stream of pressurized fluid (e.g. water and/or air) towards the filled drainage cavities of the paved surface, and may simultaneously vacuum the ejected filter media.

One potential mechanism by which the spent filter media disposed within the drainage cavities can be removed using a fluid jet is explained with reference to FIG. 5A. In FIG. 5A, a jet 310 is illustrated as being positioned and oriented such that the pressurized fluid (e.g. water and/or air) discharged from the jet 310 is incident on the surface of the encrusted filter media (not shown) disposed proximal to the leading edge 371 of the drainage cavity 360. The encrusted filter media is broken up by the pressurized fluid striking its surface. Continued application of the jet causes the pressurized fluid to be deflected by the curved surface defining the upper concave portion or cupule 362 of the drainage cavity 360, such that the fluid, along with any entrained air and spent filter media, is forced out of the cupule 362 of the drainage cavity 360. The general direction and trajectory in which the fluid is discharged from the jet 310 is indicated by the arrow 311. The removal of the filter media from the upper concave portion or cupule 362 of the drainage cavity 360 is further facilitated by the curvature of the surface defining the trailing edge 373 of the upper portion 362 of the drainage cavity 360, which deflects the fluid carrying the spent filter media upwards. The pressure of the fluid being directed towards the drainage cavity 360 may be adjusted to control the degree to which the fluid stream exiting from the trailing edge 362, which carries the spent filter media and any residue, is vertically elevated from the paved surface as it is ejected from the drainage cavity 360 and may be collected by a vacuum.

The spent filter media discharged from the drainage cavity 360 may be collected by a hopper (not shown). As would be appreciated, the hopper may be provided on the cleaning apparatus. The hopper may be positioned with respect to the jet 310 such that any spent filter media leaving the drainage cavity 360 from the trailing edge 373 is automatically collected by the hopper. In one aspect, the cleaning apparatus may further comprise a vacuum to facilitate the removal and collection of the spent filter media. Such vacuum may be, for example, positioned adjacent to the jet.

The curvature of the wall defining the upper portion 362 of the drainage cavity 360 is generally configured to facilitate bulking of the spent encrusted filter media due to the impact of the pressurized fluid, air entrained by the expanding, pressurized fluid, and the resulting turbulence. Furthermore, the profile of the drainage cavity 360, in particular the curvature of the wall defining the concave upper portion or cupule 362, may be modified according to a number of different factors such as, for example, the horizontal speed at which the cleaning apparatus is being driven, the pressure of the jet, the angle at which the fluid is being ejected by the jet, and the physical properties of the filter media and the accumulated debris and pollutants.

In the mechanism illustrated in FIG. 5A, the profile of the drainage cavity 360 may reduce the likelihood of any filter media disposed within the conduit 364 of the drainage cavity from being removed. This allows only the heavily contaminated filter media contained within the cupule 362 of the drainage cavity 360 to be removed without substantially disturbing the filter media disposed within conduit 364.

Figure 5B:
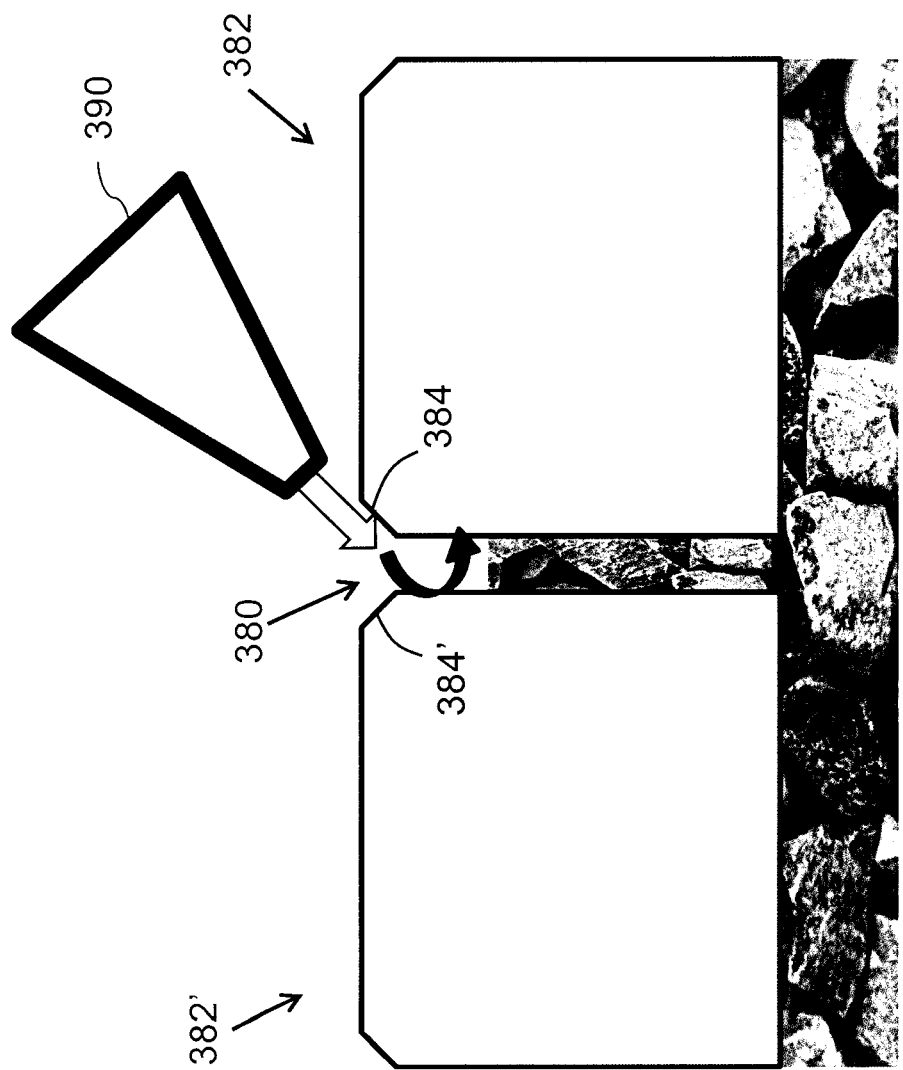
FIG. 5B is a schematic diagram illustrating the process of FIG. 5A being applied to a drainage cavity formed by paving stones with beveled top edges.

For comparison purposes, FIG. 5B illustrates a drainage cavity 380 formed by two adjacent paving elements 382, 382' having beveled top edges. Similar paving elements having beveled top edges are generally known in the art as described, for example, in U.S. Pat. Nos. 5,342,142 and 4,834,575. As illustrated, the beveled edges 384, 384' are substantially linear, such that the drainage cavity 380 formed by adjacent paving elements 382, 382' is funnel-shaped. It has been observed that, in a paving surface having such "funnel-shaped" drainage cavities, the upper portion of the drainage cavities may become "clogged" due to accumulation of fine debris, which impedes passage of fluid through the drainage cavities. With reference to FIG. 5B, when attempts were made to clean the drainage cavity by removing the accumulated debris using a combination of a jet 390 and a vacuum (not shown), it was found that the pressurized fluid ejected from the jet 390 caused the accumulated debris to be displaced deeper into the drainage cavity 380 in at least some cases. Accordingly, it was found that material disposed within such "funnel-shaped" drainage cavity could not be effectively removed using such cleaning method and apparatus.

Figure 6:
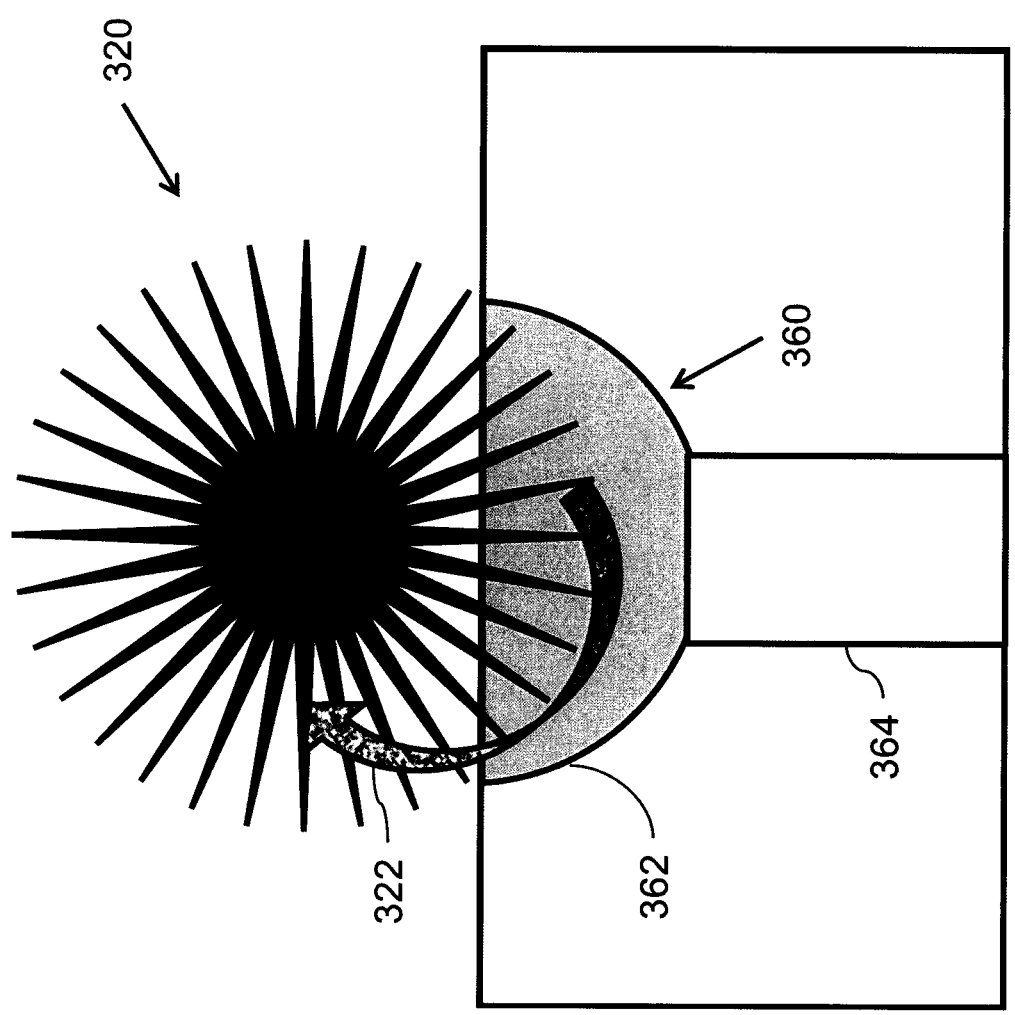
FIG. 6 is a schematic diagram illustrating another process for removing the filter media from the drainage cavity.

FIG. 6 illustrates another potential mechanism by which the spent filter media disposed within the drainage cavities can be removed. Specifically, in FIG. 6, a brush 320 is used to remove the spent filter media (not shown) from the upper portion 362 of the drainage cavity 360. The brush 320 may be, for example, a rotary brush that is attached to other machinery that is adapted to rotate the brush and apply water, forced air or vacuum as needed. The arrow 322 indicates the general direction in which the spent filter media is ejected when the rotary brush is operated in a clock-wise direction.

Once the spent filter media has been removed from the drainage cavity, the drainage cavity may be refilled with new filter media. Alternatively, the spent filter media removed from the drainage cavity may be collected by the cleaning apparatus and regenerated. For example, the spent filter media may be regenerated using various known chemical, biological, and physical treatment processes, such as by heating, filtering, using disinfectants and/or enzymes, or skimming off any oils and hydrocarbons retained by the spent filter media. The regenerated filter media may then be used to refill the drainage cavity. In this way, the filter media may be recycled to reduce waste. It will be appreciated that the steps of removing the spent filter media, regenerating the spent filter media, and then refilling the drainage cavity with new and/or regenerated filter media may be performed using the cleaning apparatus in a single pass (i.e. without requiring the cleaning apparatus to travel over a drainage cavity more than once).

FIG. 7 illustrates the paving element 200 according to another aspect. As shown in FIG. 7, the paving element 200 comprises an upper surface 213, a lower surface 215, and a partial cavity 230 formed in the paving element 200. The partial cavity 230 includes cupule 232, defined by a substantially concave surface, and a conduit 234 extending through the paving element, which serves as a drainage opening. As shown in FIG. 7, a top orifice 241 of the cavity 230 formed on the upper surface 213 is illustrated as being an approximately elliptical or oblong orifice, and a bottom orifice 243 of the cavity 230 formed on the lower surface 215 is illustrated as being semicircular in shape. The shapes of the openings are further illustrated in FIG. 8, which shows the plan view of the paving element 200.

FIG. 9A illustrates the end elevation of a paving element 400 according to yet another aspect. As shown in FIG. 9A, the paving element 400 comprises an upper surface 413, a lower surface 415, and a partial cavity 430 extending between the upper surface 413 and the lower surface 415. The partial cavity 430 includes a substantially concave cupule 432 and a conduit 434. Both the upper orifice formed on the upper surface 413 and lower orifice formed on the lower surface 415 are illustrated as being semicircular. The shape of the orifices is further illustrated in FIG. 9B, which shows the plan view of the paving element 400. As shown in FIGS. 9A and 9B, the cupule 432 is illustrated as being defined by a curved surface having both a concave segment and a convex segment. However, it would be understood that the portion of the cavity formed by such surface would still be considered to be a cupule.

Figure 10:
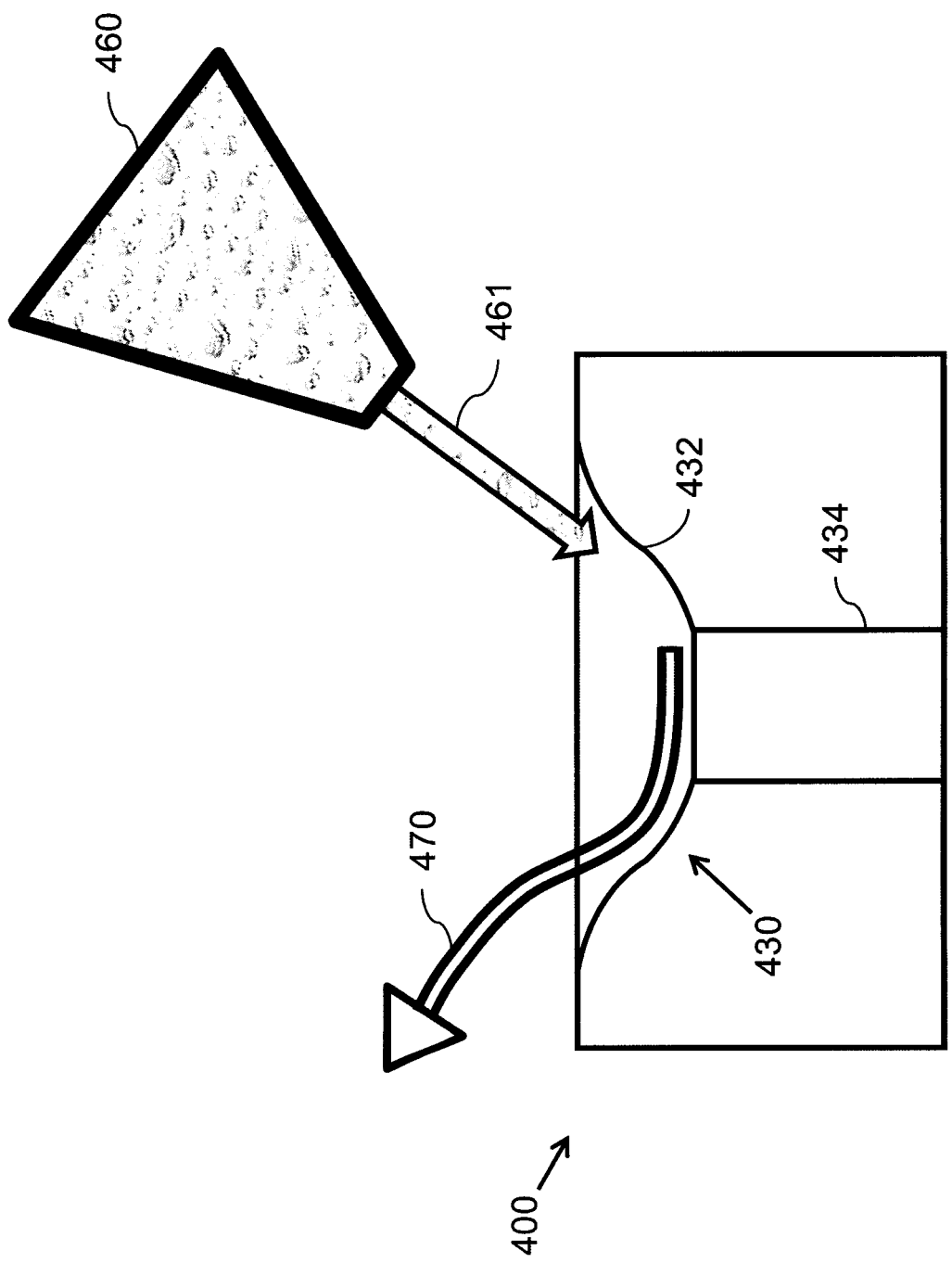
FIG. 10 is a schematic diagram illustrating a process of removing a filter media from the drainage cavity formed by the paving element of FIG. 9A.

FIG. 10 illustrates a potential mechanism for removing spent filter media from a drainage cavity formed by the paving stone 400 of FIGS. 9A and 9B. In FIG. 10, a jet 460 is illustrated as being used to eject a stream of fluid 461 towards the drainage cavity. The fluid ejected from the jet 460 causes any spent filter media disposed within the drainage cavity to be discharged in the trajectory indicated by an arrow 470.

Figure 11:
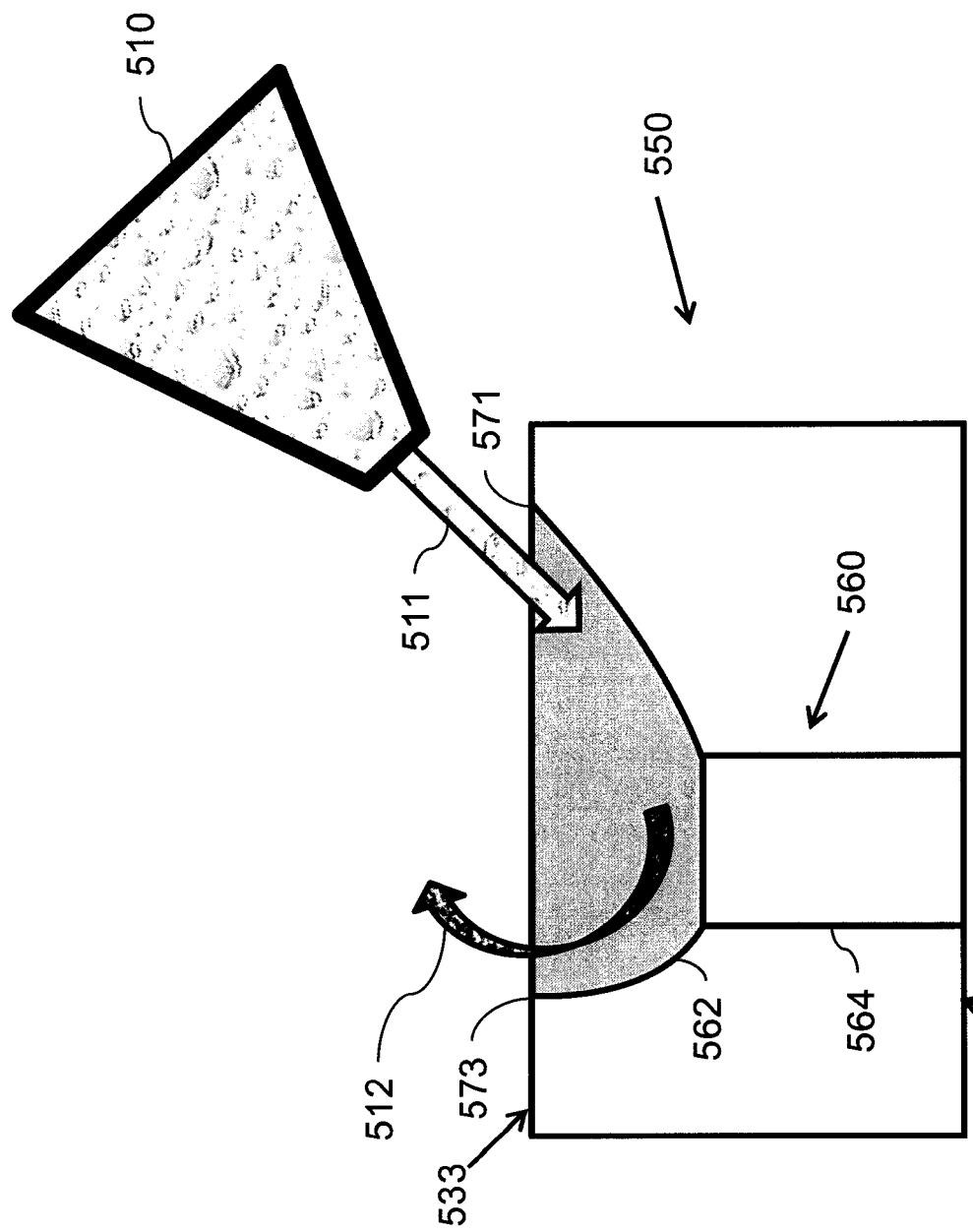
FIG. 11 is a schematic diagram illustrating the process of removing filter media from an asymmetric drainage cavity according to one aspect.

FIG. 11 illustrates the elevation view of the paving element 550 according to yet another aspect. In FIG. 11, the paving element 550 is illustrated as comprising an upper surface 533, a lower surface 535, and a partial cavity 560 extending between the upper surface 533 and the lower surface 535. The partial cavity 560 includes a concave upper portion or cupule 562 and a conduit 564.

As illustrated in FIG. 11, the upper portion 562 is asymmetric about an axis extending through the height of the paving element. In this way, when the paving elements are laid to form a pavement, the drainage cavities formed on the paved surface (which may be filled with a filter media) are adapted to be cleaned in a directional manner. Specifically, as illustrated in FIG. 11, the fluid ejected from a jet 510 strikes the surface of the encrusted or spent filter media proximal to the leading edge 571 to cause the spent filter media to be discharged in the general direction indicated by the arrow 512. The general direction of the fluid being ejected from the jet 510 is indicated by the arrow 511. The use of such asymmetrical drainage cavity may facilitate the removal and collection of the spent filter media in at least some cases.

Figure 13:
FIG. 13 is a plan view of the insert positioned inside the drainage cavity in FIG. 12.
Figure 12:
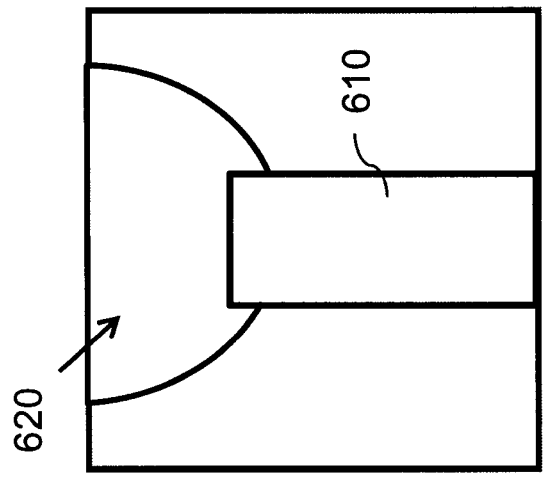
FIG. 12 is an end elevation view illustrating an insert positioned inside the drainage cavity.

In an aspect as illustrated in FIG. 12, an insert 610 is disposed inside a lower portion of a drainage cavity. The cupule 620 of the drainage cavity may be filled with a filter media. Specifically, as shown in FIG. 12, the insert 610 is located in the conduit of the drainage cavity. Once the insert 610 has been placed, the cupule 620 is filled with the filter media, such that the filter media is blocked from reaching the lower portion of the drainage cavity due to the presence of the insert 610. It will be appreciated that the insert 610 would generally be water-permeable, such that the presence of the insert 610 does not substantially impede the flow of fluid through the drainage cavity. FIG. 13 illustrates the top view of the insert 610 disposed inside the drainage cavity. In one aspect, the insert provides an interlocking mechanism for preventing relative movement of adjacent paving elements with respect to one another.

While various aspects of the paving element have been described above in which a single cavity is formed therein, it will be appreciated that various parameters, such as the number and configuration of the cavity provided on a pavement element may be varied.

Figure 14:
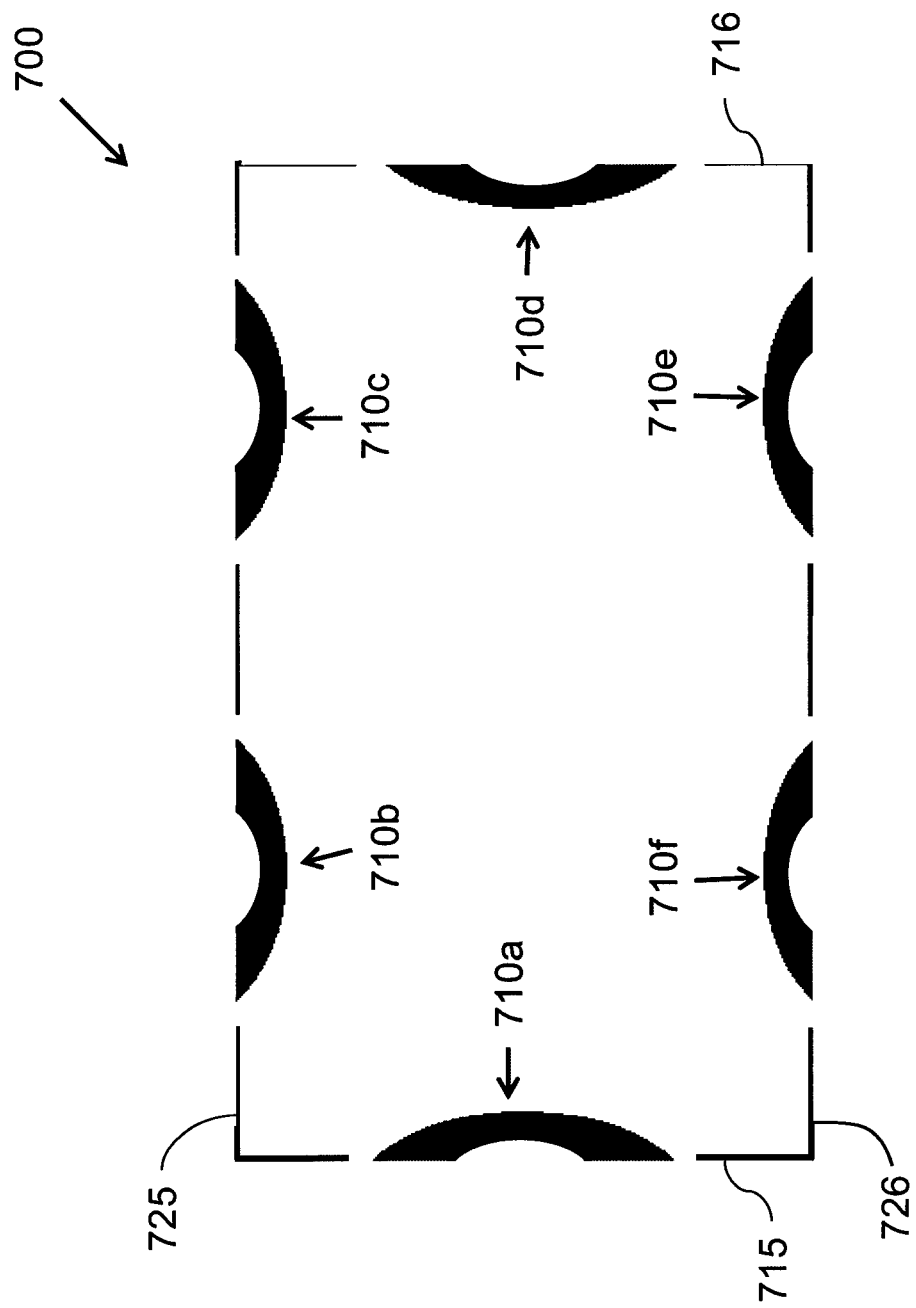
FIG. 14 is a plan view of a paving element according to yet another aspect.

FIG. 14 illustrates an aspect of the paving element 700 wherein a plurality of generally oval-shaped partial cavities 710a-f is provided at the edges of the paving element 700. Specifically, the paving element 700 is illustrated as having two partial cavities 710a, 710d formed at the short edges 715, 716 and four partial cavities 710b, 710c, 710f, 710e formed at the long edges 725, 726. As shown in FIG. 14, each of the cavities 710a-f is identical to the cavity illustrated in FIGS. 7 and 8, which have been previously described above.

Figure 15:
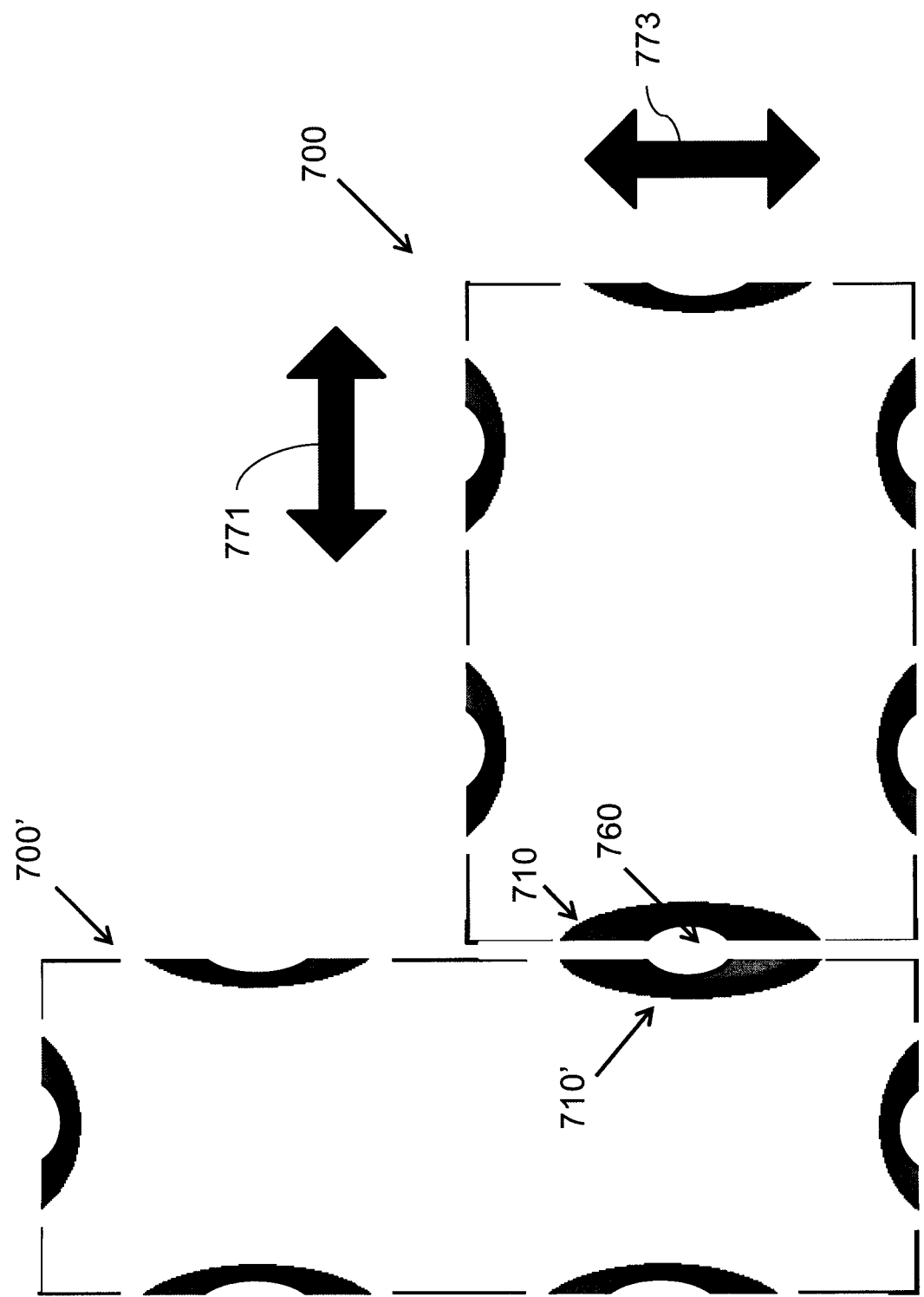
FIG. 15 is a plan view illustrating the paving element of FIG. 14 being positioned adjacent to a corresponding paving element to form a drainage cavity.

A paving element having a plurality of cavities may be laid adjacent to corresponding paving elements to create one or more drainage cavities. FIG. 15 illustrates an aspect wherein the paving element 700 is positioned adjacent to another identical paving element 700', such that a drainage aperture 760 is cooperatively formed by the partial cavities 710, 710' of the adjacent paving elements 700, 700'. As will be understood, a paved surface having a plurality of drainage cavities may be formed by laying additional paving elements adjacent to one another. It will also be appreciated that the drainage cavities formed in such manner would be oriented along different axes. Specifically, in FIG. 15, the longitudinal axis of at least some of the generally oval drainage cavities are oriented perpendicular to the longitudinal axis of the other drainage cavities. The longitudinal axes of the drainage cavities are indicated using the arrows 771, 773 for reference.

Figure 16:
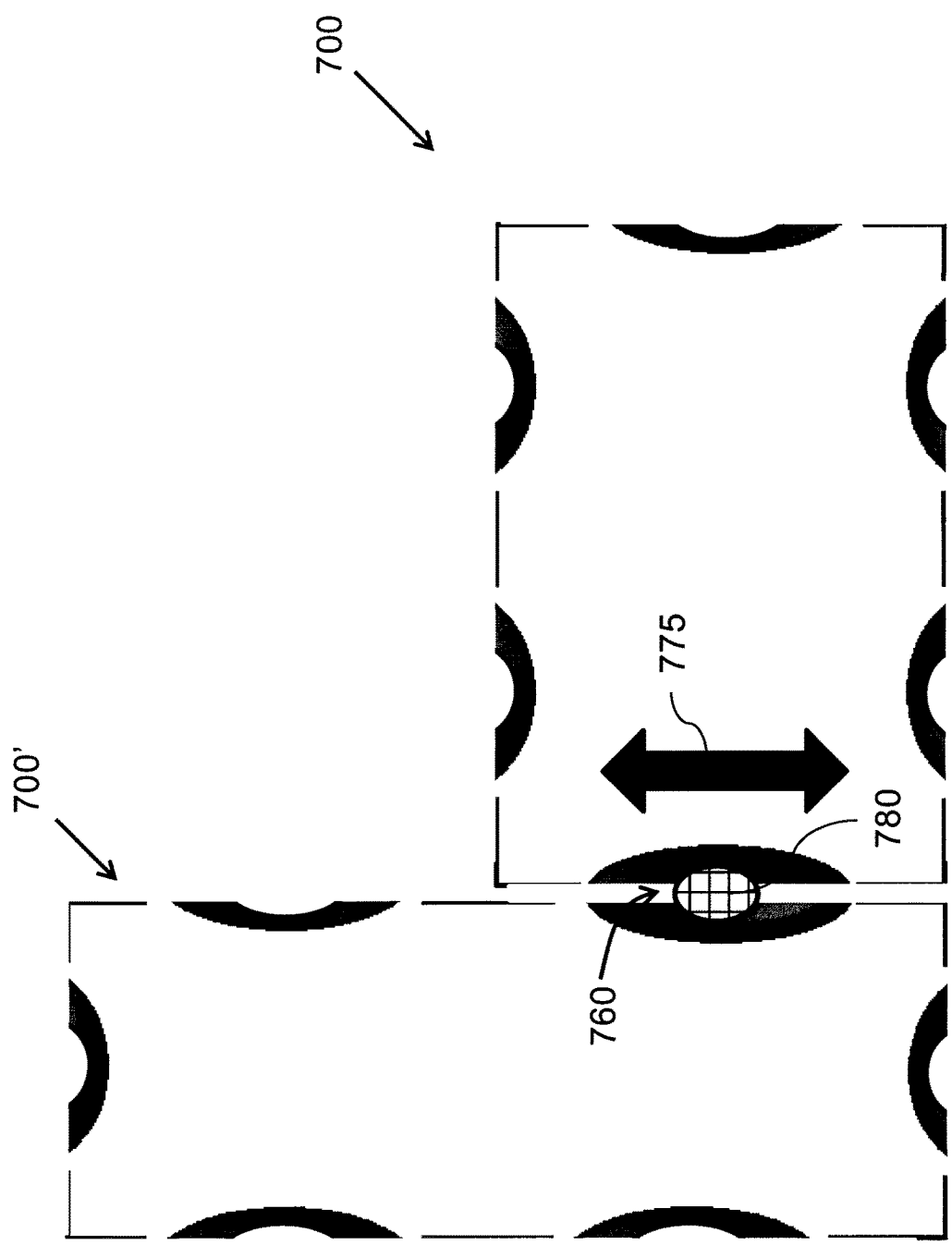
FIG. 16 is a plan view illustrating an insert being positioned inside the drainage cavity formed in FIG. 15.

In a further aspect illustrated in FIG. 16, an insert 780 is disposed within the drainage cavity 760 formed by the neighbouring paving elements 700, 700'. As previously explained, the presence of the insert 780 blocks the filter media from reaching the lower portion of the drainage cavities. The longitudinal axis of the drainage cavity 760 is indicated using the arrow 775.

Figure 17:
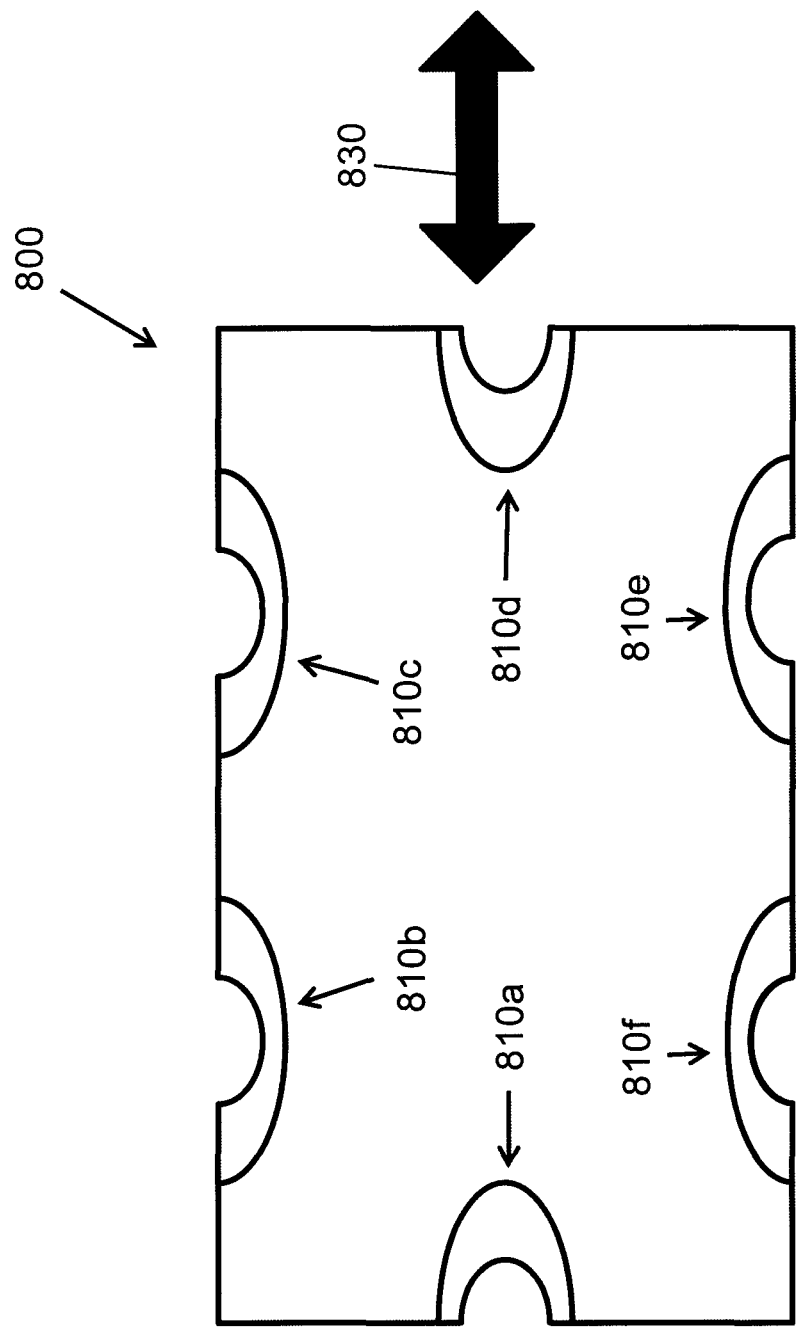
FIG. 17 is a plan view of a substantially rectangular paving element according to yet another aspect.

FIG. 17 illustrates another aspect of the paving element 800 wherein a plurality of partial cavities 810a-f is formed therein. In FIG. 17, all of the partial cavities 810a-f are formed such that when drainage cavities are formed by laying corresponding paving elements adjacent to one another, the longitudinal axes of all of the drainage cavities will be oriented in a single orientation indicated by the arrow 830. As would be understood, uniform orientation of the drainage cavities may facilitate the cleaning of the paved surface in some cases.

Figure 18:
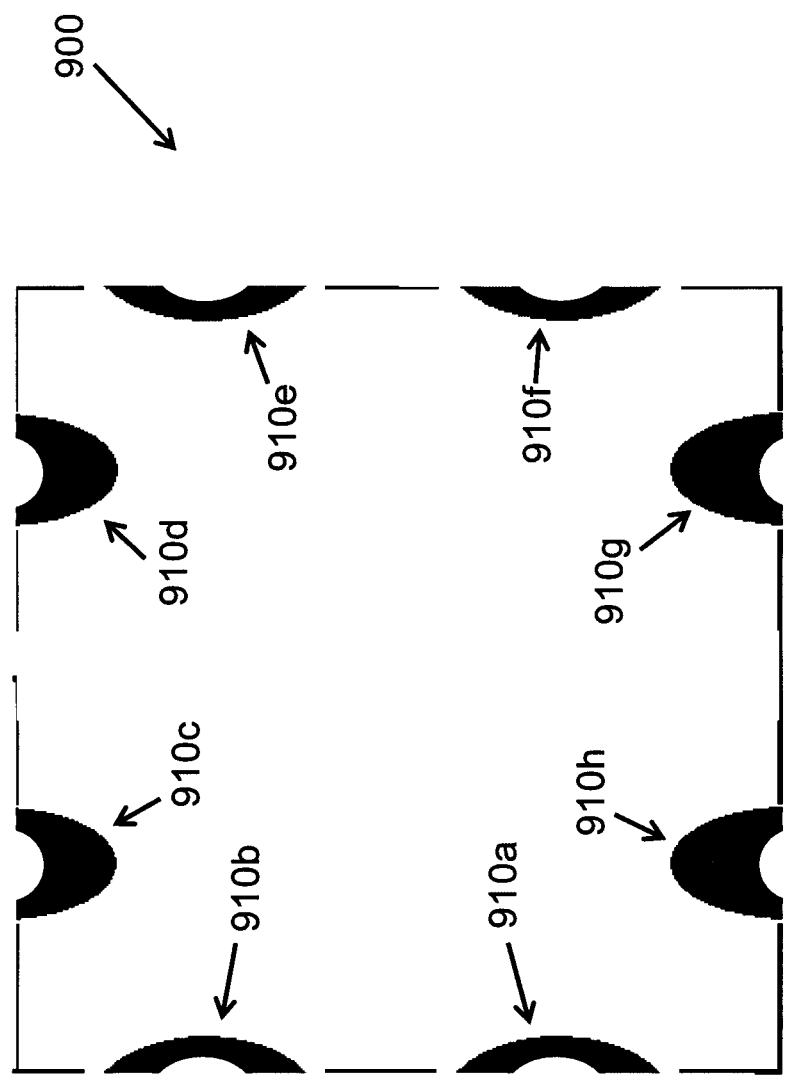
FIG. 18 is a plan view of a substantially square paving element according to yet another aspect.

FIG. 18 illustrates yet another aspect of the paving element 900. In FIG. 18, the paving element 900 is substantially square, and is provided with a plurality of generally oval partial cavities 910a-h formed at the edges of the element. As illustrated, the cavities 910a-h are formed such the longitudinal axes of the drainage cavities created by joining the cavities 910a-h with the corresponding cavities would be oriented in a single orientation.

Figure 20:
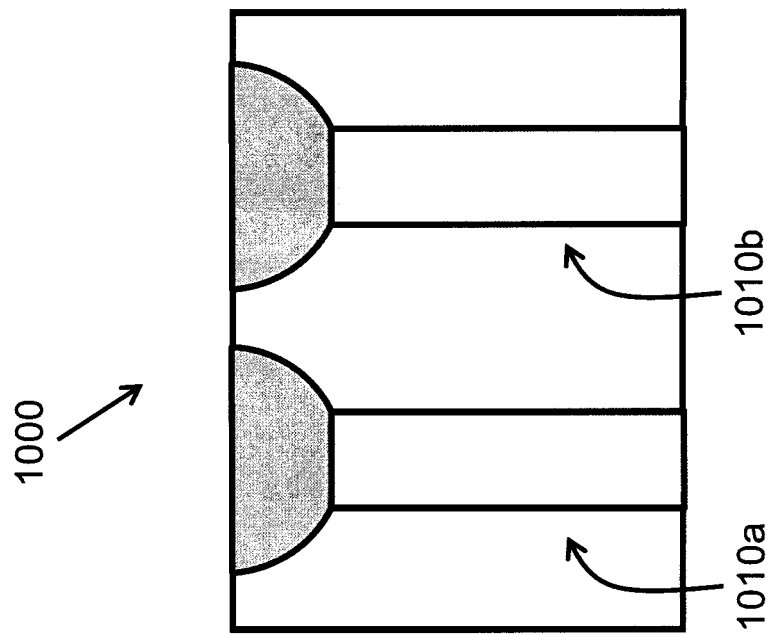
FIG. 20 is an end elevation view of the portion of the paving element of FIG. 19.
Figure 19:
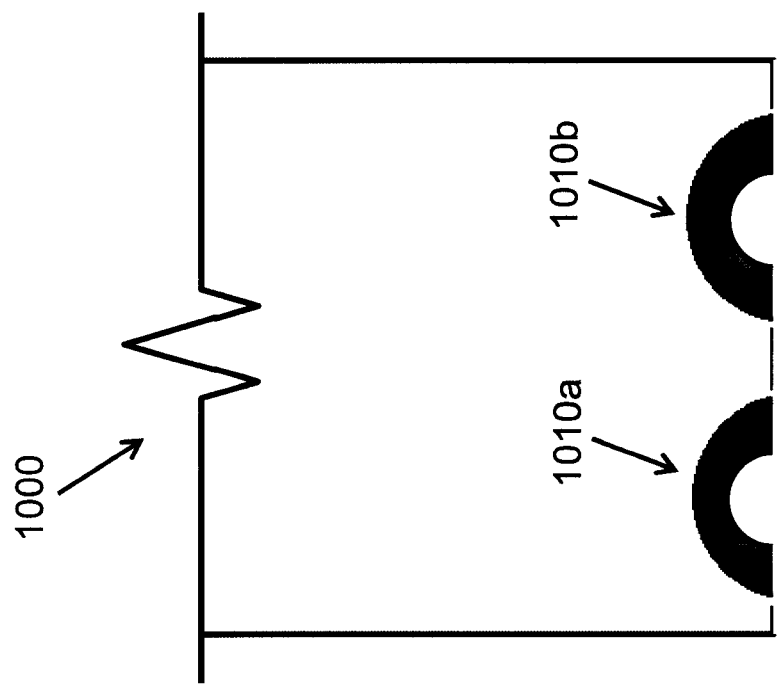
FIG. 19 is a plan view illustrating a portion of a paving element according to yet another aspect.

FIG. 19 illustrates a portion of the paving element 1000 according to yet another aspect, wherein two partial cavities 1010a, 1010b are formed on at least one of the edges of the paving element 1000. Both partial cavities 1010a, 1010b are illustrated as forming semicircular openings on the top surface and the bottom surface of the paving element 1000. An end elevation view of the paving element 1000 is illustrated in FIG. 20.

Figure 21:
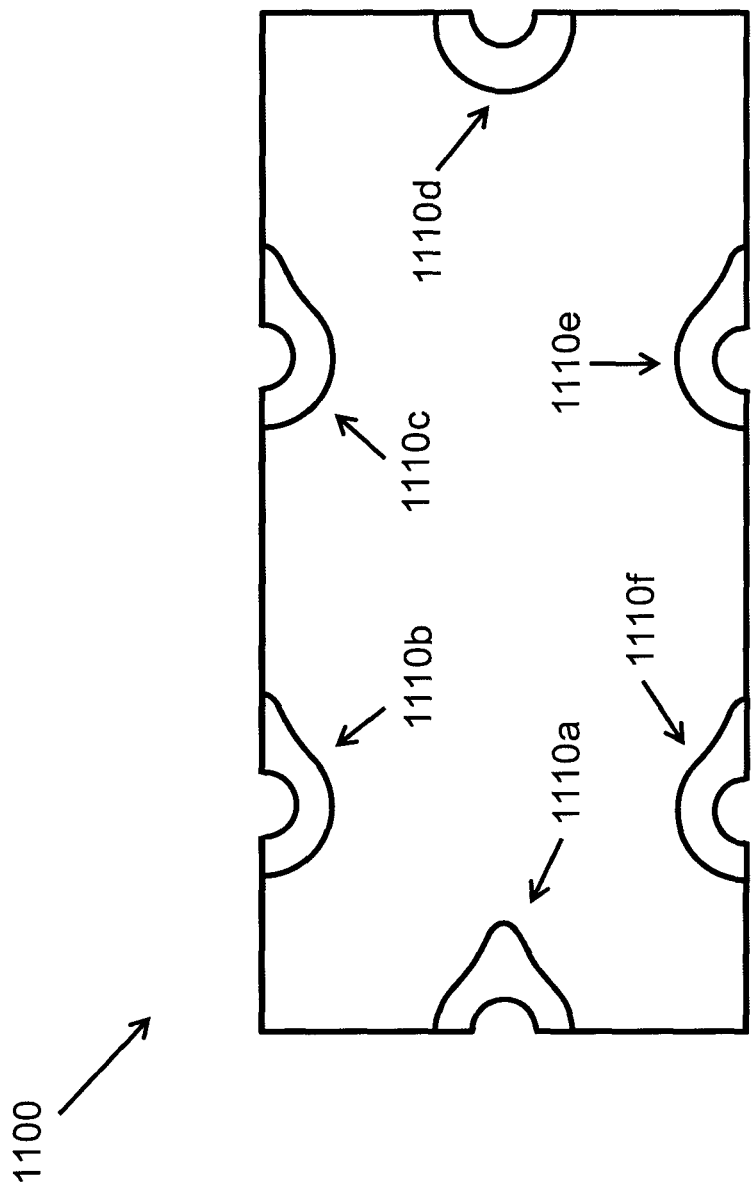
FIG. 21 is a plan view illustrating a paving element according to yet another aspect.

FIG. 21 illustrates a paving element 1100 according to yet another aspect. In FIG. 21, the paving element 1100 has a plurality of partial cavities 1110a-f formed at the edges of the element 1100. The partial cavities 1110a-f are shaped such that when the partial cavities are joined with corresponding partial cavities, "raindrop" shaped drainage cavities are formed.

As illustrated in FIG. 21 and the previous figures, the cupule of the present paving block can be of any shape, either symmetrical (e.g. circular shaped) or asymmetrical (e.g. raindrop shaped). It will be understood that once adjacent blocks are laid, the partial openings will combine to form the final drainage cavity shapes on the pavement surface.

FIG. 22 illustrates another optional aspect, wherein a paving block 1200, such as the block shown in FIG. 18, is provided with a plurality of interlocking ribs or nibs as shown at 1210. Such ribs or nibs serve to prevent adjacent stones from sliding with respect to each other and are well known in the art. As known, in the case of ribs, such ribs would extend from generally the top surface of the paving element (i.e. block or stone) to the bottom surface. In some cases, the ribs would not need to extend along the entire thickness of the paving element.

Figure 23A:
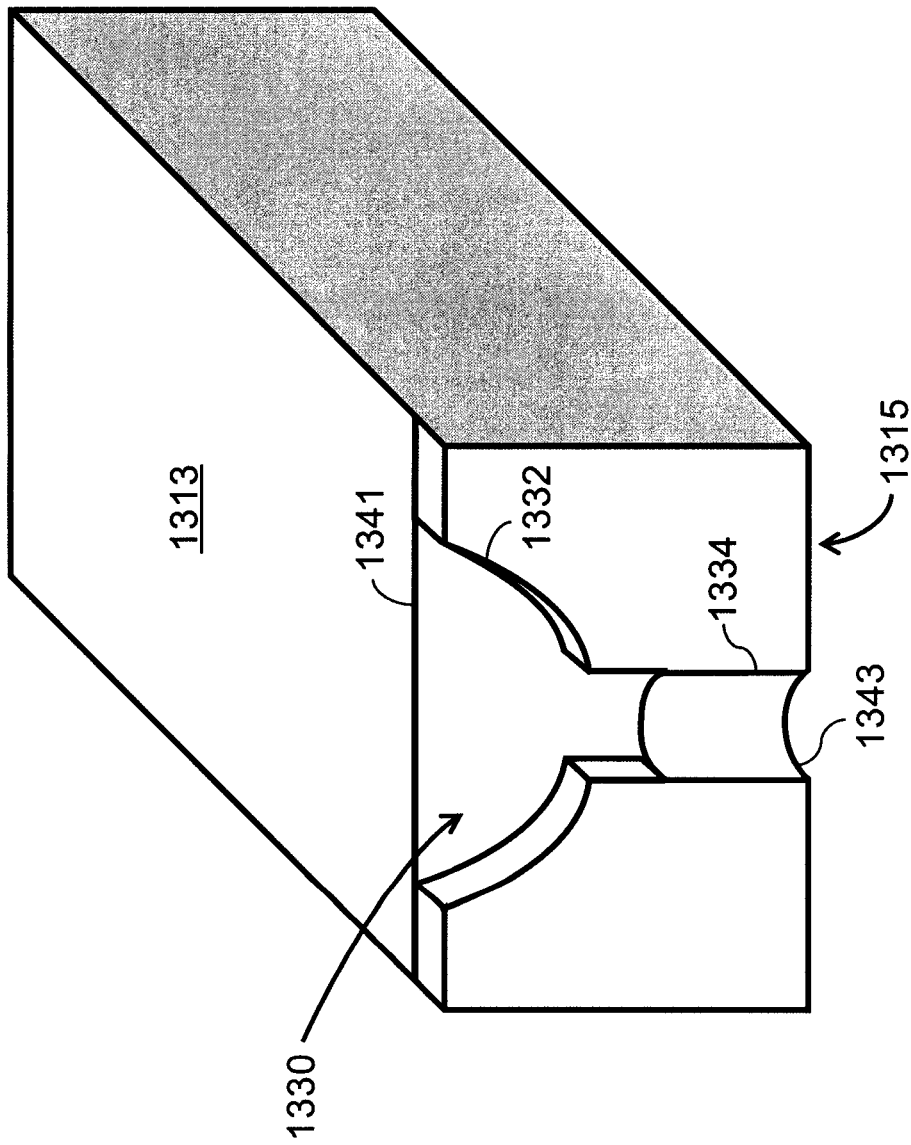
FIG. 23A is a perspective view of a paving element according to yet another aspect.
Figure 23B:
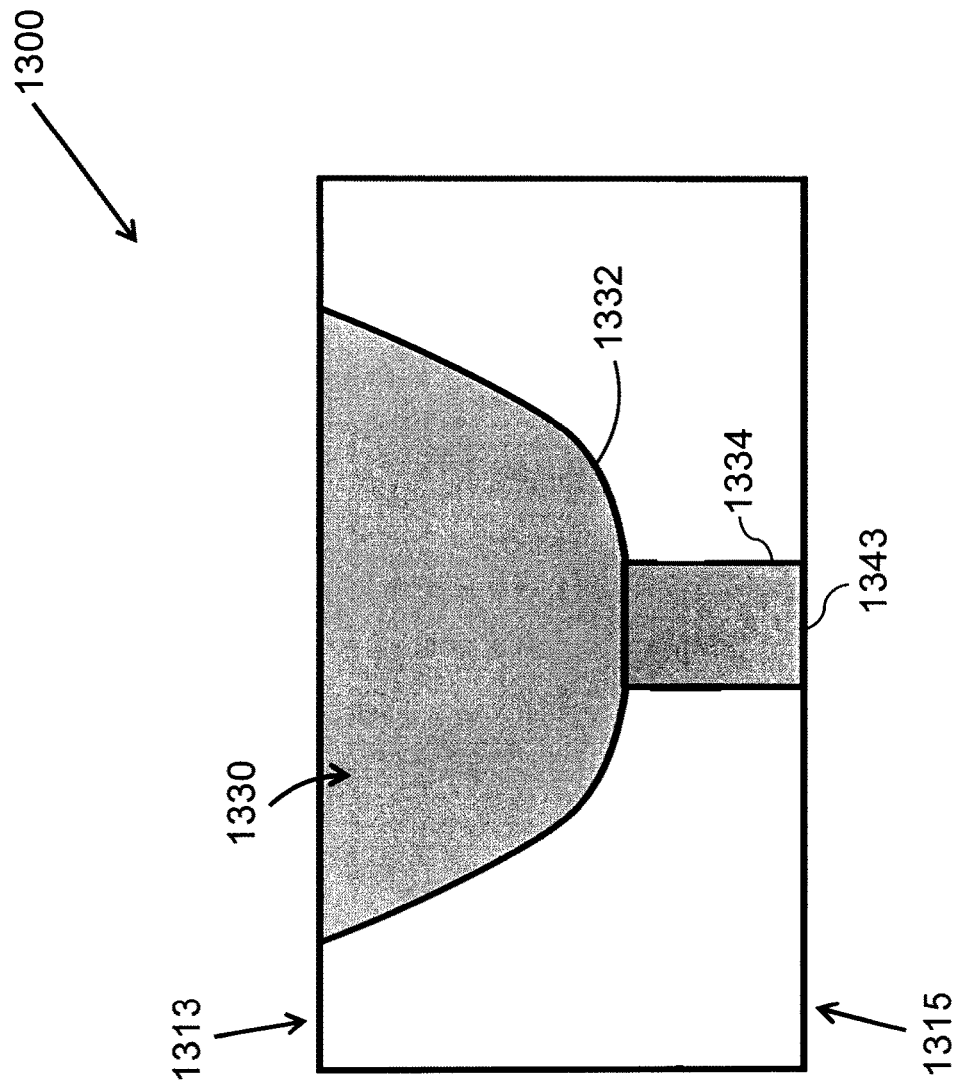
FIG. 23B is an end elevation view of the paving element of FIG. 23A.

FIG. 23A illustrates a paving element 1300 according to yet another aspect, wherein a partial cavity 1330 is formed on at least one of the edges of the paving element 1300. The partial cavity extends between an upper orifice or opening 1341 formed on the upper surface 1313 and a lower orifice or opening 1343. In contrast with the embodiments illustrated thus far, the upper orifice or opening 1341 has a rectangular shape when seen from a plan view. Thus, when the partial cavity 1330 is joined with a corresponding partial cavity, a generally rectangular drainage cavity opening may be observed on a plan view. A side elevation view of the embodiment in FIG. 23A is illustrated in FIG. 23B. The partial cavity 1330 comprises an upper portion 1332 which has a generally concave cross-section when viewed from the side, and a lower portion, or conduit or channel 1334 extending from the base of the upper portion 1332 through the paving block, thereby forming a channel extending through to the lower orifice or opening 1343 located on the lower surface 1315, as illustrated. The angle at which the upper portion 1332 slopes downwards from the upper surface 1313 may be increased or decreased to form a deeper or shallower upper cavity portion, respectively. Example embodiments of such angle adjustments are illustrated in FIGS. 24 and 25.

Figure 24:
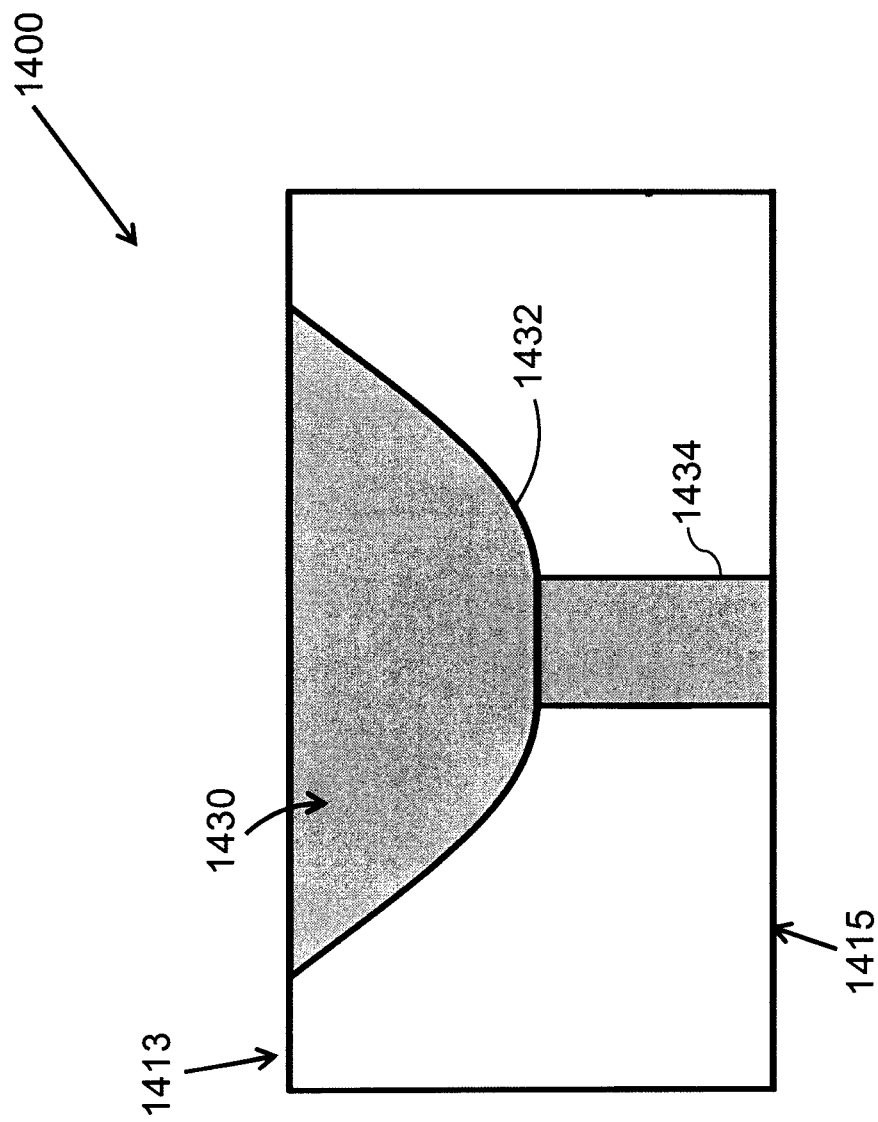
FIG. 24 is an end elevation view of a paving element according to yet another aspect.

FIG. 24 illustrates a paving element 1400 according to another aspect, wherein a partial cavity 1430 is formed on at least one of the edges of the paving element 1400. The partial cavity 1430 comprises an upper portion 1432 which has a generally concave cross-section when viewed from the side, and a lower portion, or conduit or channel 1434 extending from the base of the upper portion 1432 through the paving block, thereby forming a channel extending through to the lower orifice or opening 1443 located on the lower surface 1415, as illustrated. The angle at which the upper portion 1432 slopes downwards from the upper surface 1413 is less than the corresponding angle in FIG. 23, resulting in a shallower upper portion 1432 in relation to the upper portion 1332 in FIG. 23.

Figure 25:
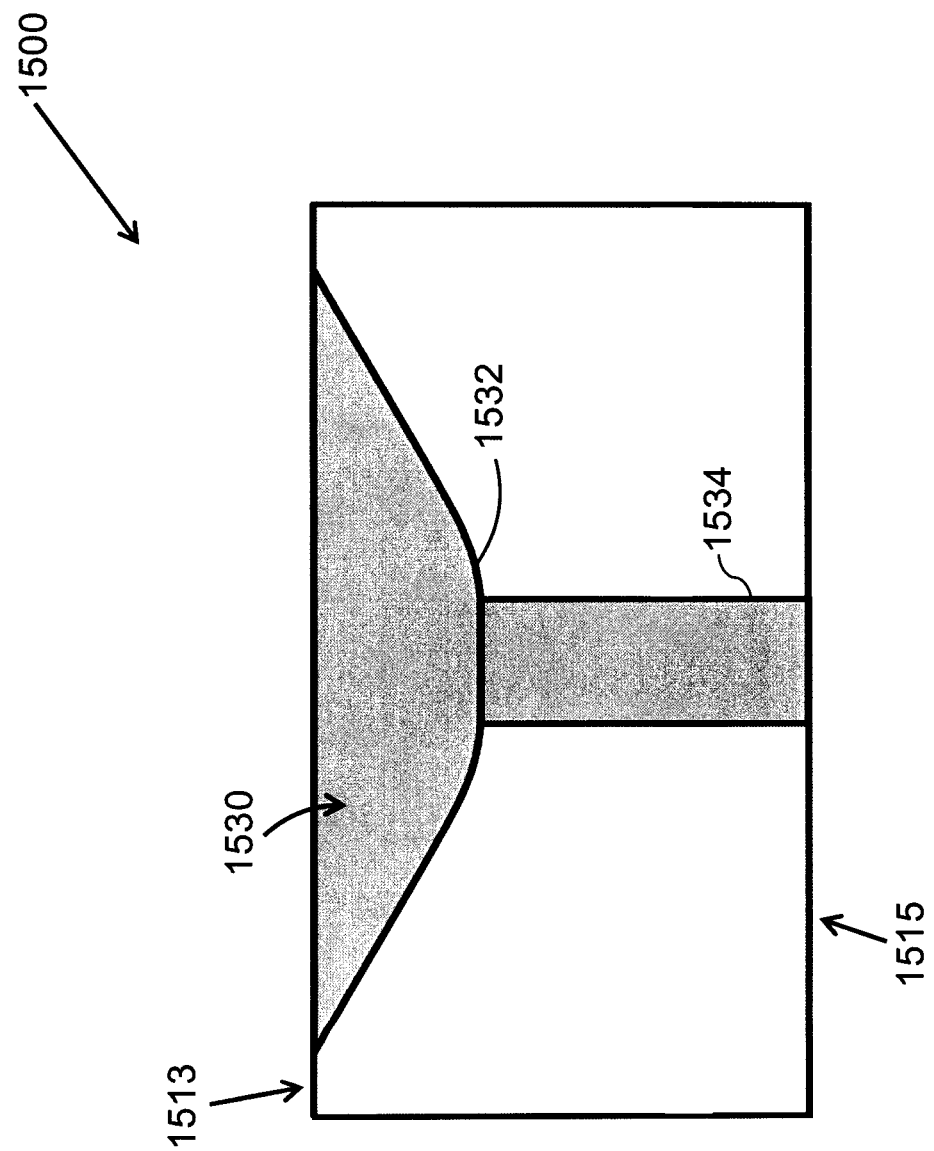
FIG. 25 is an end elevation view of a paving element according to yet another aspect.

FIG. 25 illustrates a paving element 1500 according to another aspect, wherein a partial cavity 1530 is formed on at least one of the edges of the paving element 1500. The partial cavity 1530 comprises an upper portion 1532 which has a generally concave cross-section when viewed from the side, and a lower portion, or conduit or channel 1534 extending from the base of the upper portion 1532 through the paving block, thereby forming a channel extending through to the lower orifice or opening 1543 located on the lower surface 1515, as illustrated. The angle at which the upper portion 1532 slopes downwards from the upper surface 1513 is less than the corresponding angles in FIGS. 23 and 24, resulting in a shallower upper portion 1532 in relation to the upper portions 1332 and 1432 in FIGS. 23 and 24, respectively.

In terms of cleaning of the paving elements described herein, various equipment can be used, some of which have been described above. In calculating the cleaning efficiency of the equipment, a cleaning ratio may be used. Such ratio, denoted herein as "S", would relate the amount of matter, or filter media, captured and removed by a cleaning apparatus to the original amount of filter media, wherein complete restoration of the infiltration capacity of the filter media means S=1. The term "substantial restoration" may be understood to mean that the value of S is close or equal to 1.0. The geometries of the cavities shown in FIGS. 23, 24, 25, 26, and 27 may facilitate the removal of particulates captured by the filter media by, for example, conventional street cleaning equipment or specialized equipment designed for the presently described paving elements, and thus allow for the substantial restoration of the infiltration capacity of the filter media. By allowing the substantial restoration of the infiltration capacity of the filter media, a pavement system may continue to remain effective at removing pollutants and other contaminants for a longer duration of time, than a pavement system that does not incorporate such geometries.

Figure 26A:
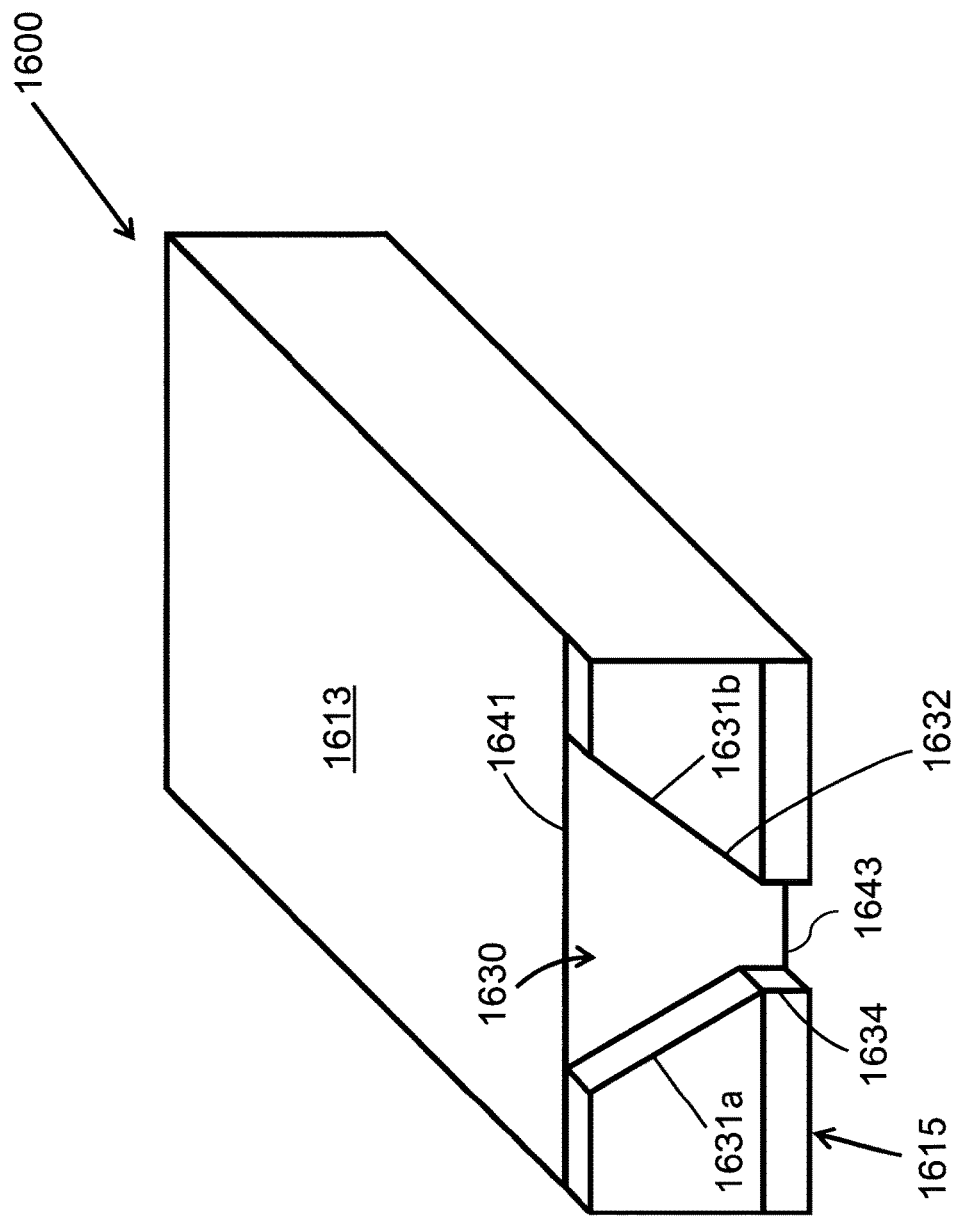
FIG. 26A is a perspective view of a paving element according to yet another aspect.
Figure 26B:
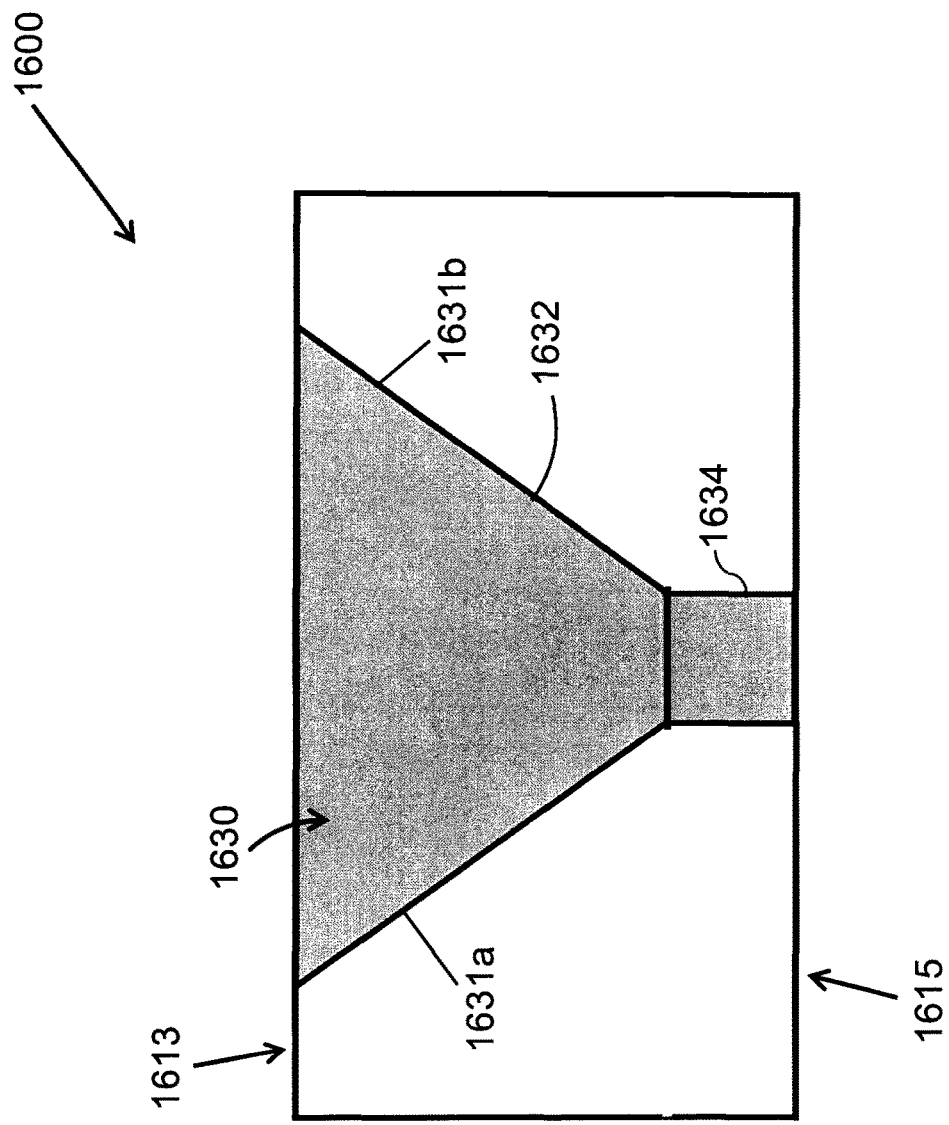
FIG. 26B is an end elevation view of the paving element of FIG. 26A.

FIG. 26A illustrates a paving element 1600 according to yet another aspect, wherein a partial cavity 1630 is formed on at least one of the edges of the paving element 1600. The partial cavity extends between an upper orifice or opening 1641 formed on the upper surface 1613 and a lower orifice or opening 1643. As with the previously described paving element, the upper orifice 1641 is generally rectangular in shape when seen from a plan view. The partial cavity 1630 comprises an upper portion 1632 located proximal to the upper surface 1613 and a lower portion 1634 extending generally from the base of the cupule 1632 through the paving block, thereby forming a channel extending through to the lower orifice or opening 1643 located proximal to the lower surface 1615. In this particular embodiment, the upper portion 1632 of the partial cavity includes substantially planar portions 1631*a* and 1631*b* such that the upper portion 1632 is not concave in nature when viewed from any perspective. The angles of the substantially planar portions 1631*a* and 1631*b* relative to the top surface 1613 of the paving element 1600 may be increased or decreased to form a deeper or shallower upper cavity portion, respectively. Additionally, the lower portion 1643 of the partial cavity 1630 may be tubular or rectangular in shape. FIG. 26A illustrates an embodiment in which there is a rectangular shaped lower portion 1643. When the partial cavity 1630 is joined with a corresponding partial cavity, a rectangular shaped drainage cavity opening may be observed on the upper surface 1613 from a plan view. The geometries shown in FIG. 26 may facilitate the removal of residue captured by the filter media by conventional regenerative-air street cleaning equipment, and thus aid in the substantial restoration of the infiltration capacity of the filter media. An elevation view of the embodiment in FIG. 26A is illustrated in FIG. 26B.

Figure 27:
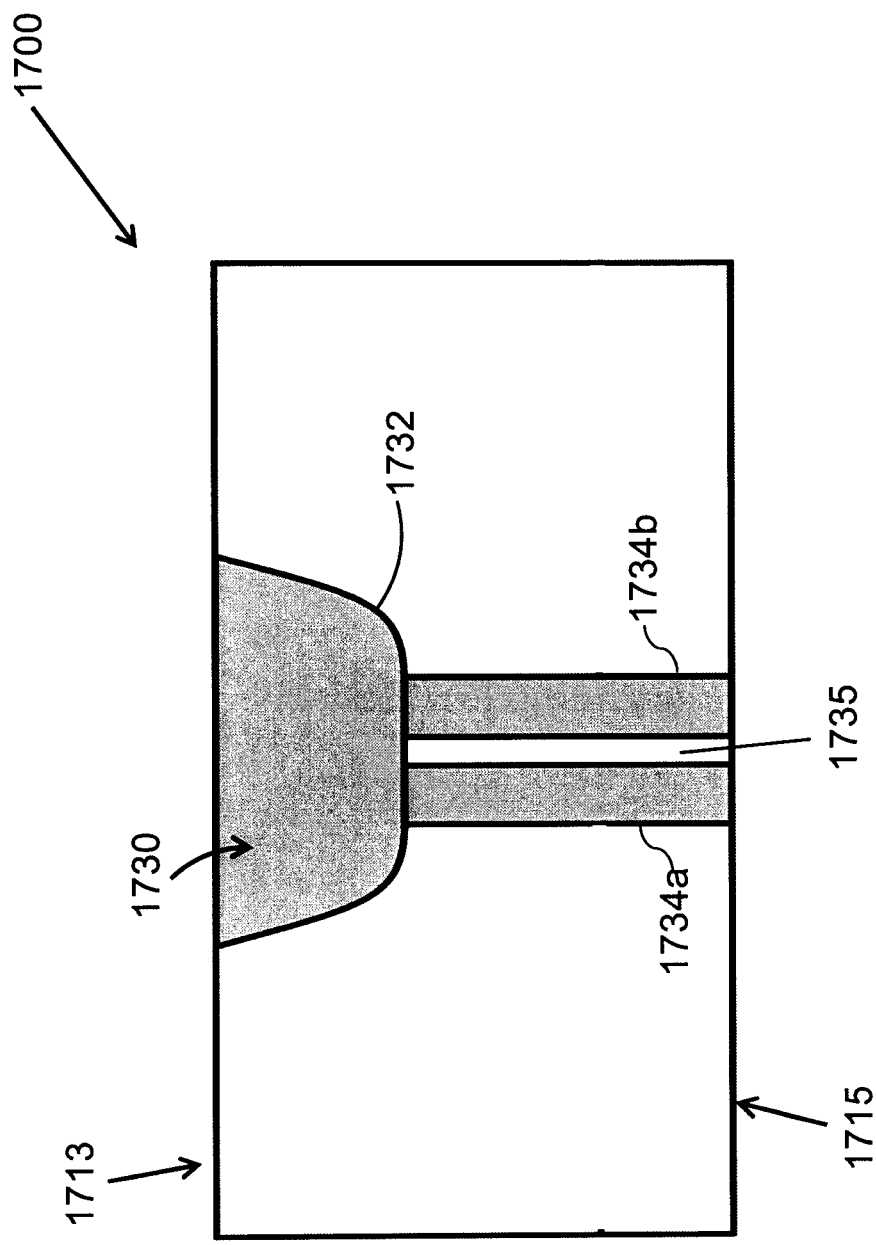
FIG. 27 is an end elevation view of a paving element according to yet another aspect.

FIG. 27 illustrates a paving element 1700 according to yet another aspect, wherein a partial cavity 1730 is formed on at least one of the edges of the paving element 1700. As above, the paving stone 1700 includes having an upper surface 1713 and a lower surface 1715. In this embodiment, the partial cavity 1730 may include one upper portion 1732 and two lower portions 1734*a* and 1734*b* which may be separated by a wall 1735. As discussed further below, in other aspects, more than two lower portions may be provided in the stone of FIG. 27. The lower portions 1734*a* and 1734*b* of the partial cavity 1730 may be tubular or rectangular in shape. According to this embodiment, when the partial cavity 1730 is joined with a corresponding partial cavity, the resulting drainage cavity comprises one full upper portion and two full tubular or rectangular bottom portions. The geometries shown in FIG. 27 may facilitate the removal of residue captured by the filter media by conventional regenerative-air street cleaning equipment, and thus aid in the substantial restoration of the infiltration capacity of the filter media.

Figure 28A:
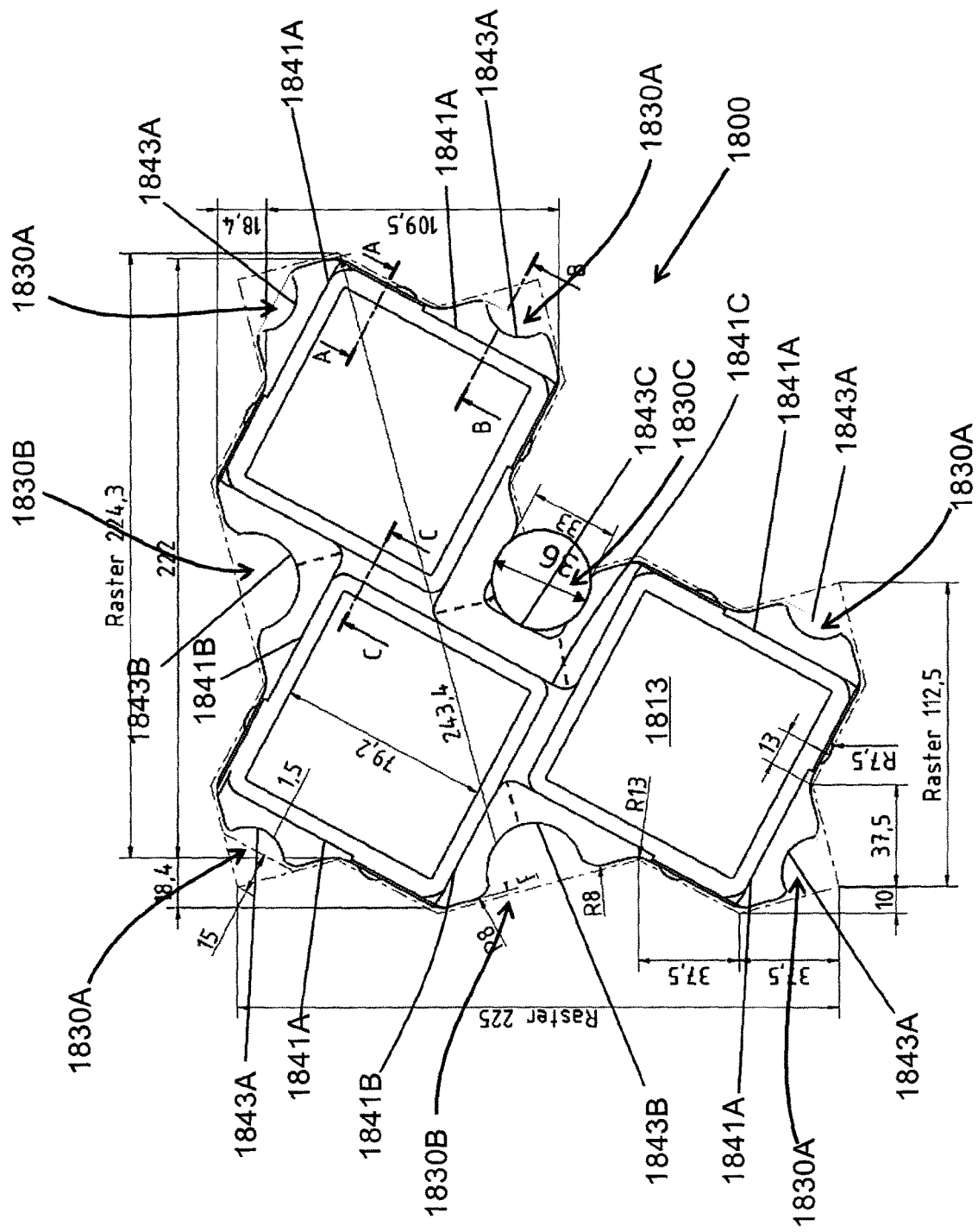
FIG. 28A is a plan view of a paving element according to yet another aspect.
Figure 28B:
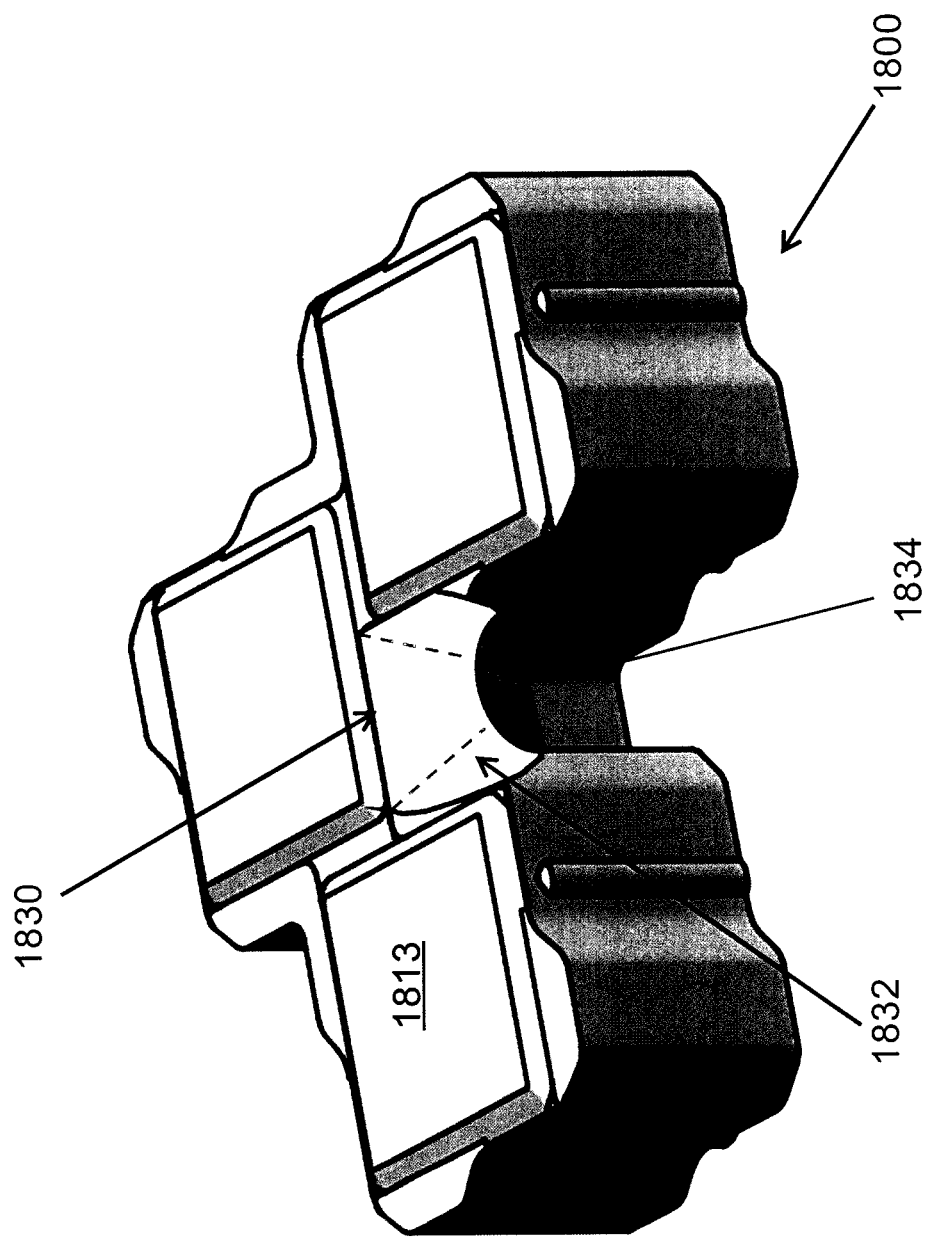
FIG. 28B is a perspective view of the paving element of FIG. 28A.
Figure 31:
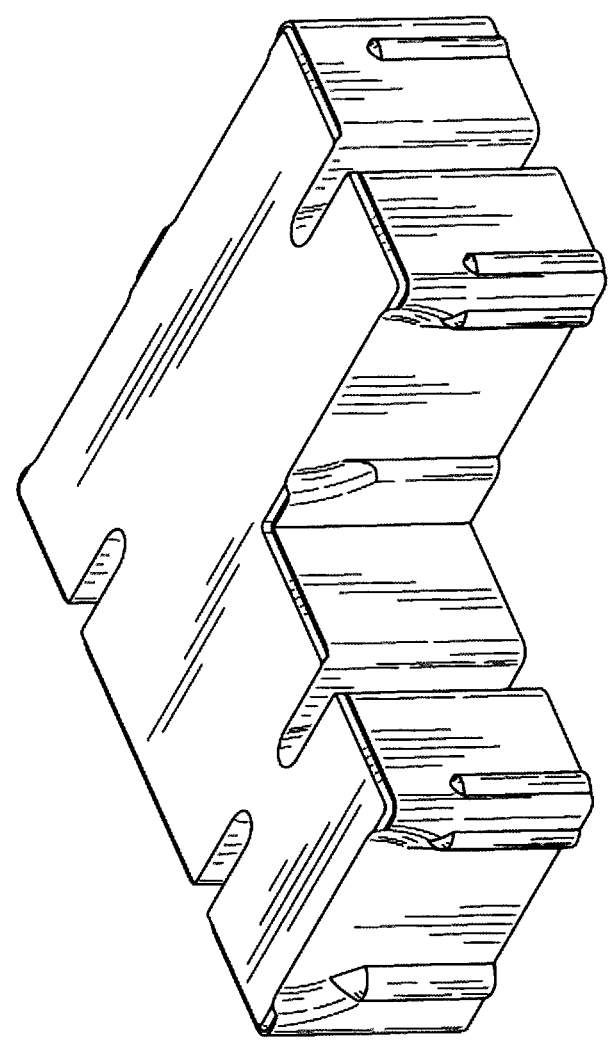
FIG. 31 is a plan view of a paving element according to another aspect.
Figure 32:
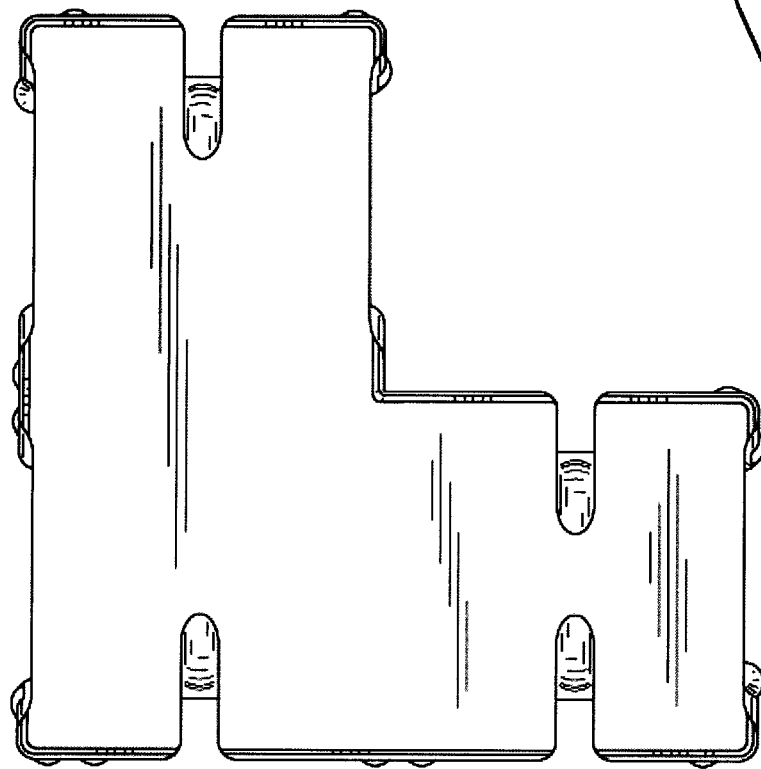
FIG. 32 is a side perspective view of the paving element shown in FIG. 31.
Figure 36:
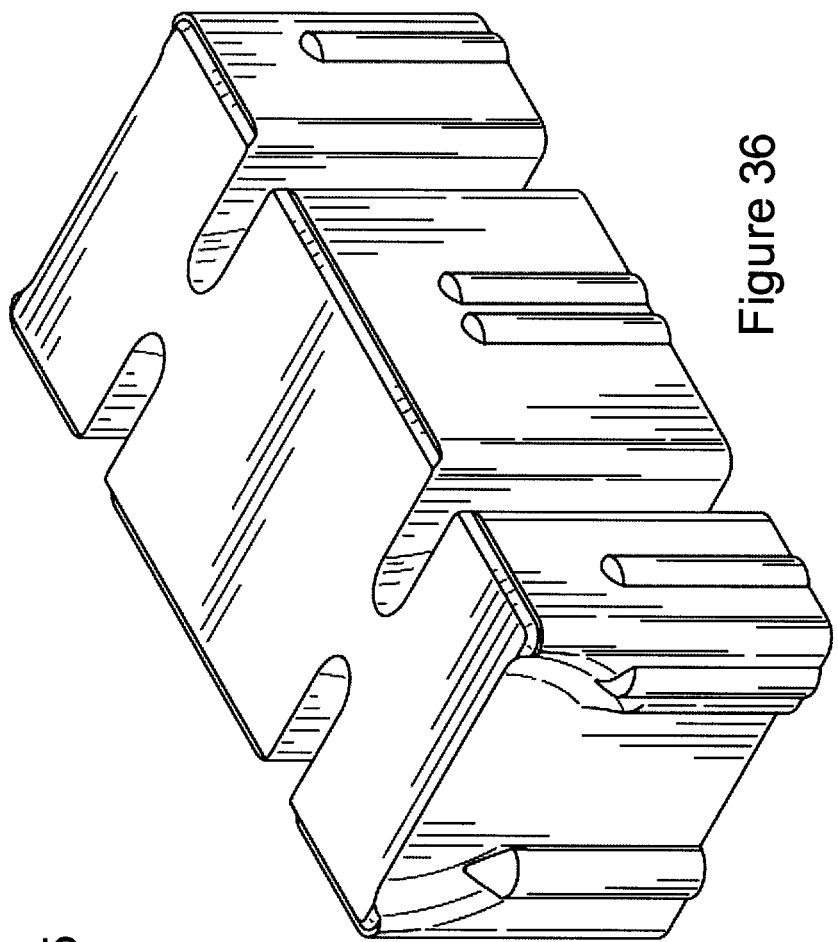
FIG. 36 is a side perspective view of the paving element shown in FIG. 35.
Figure 35:
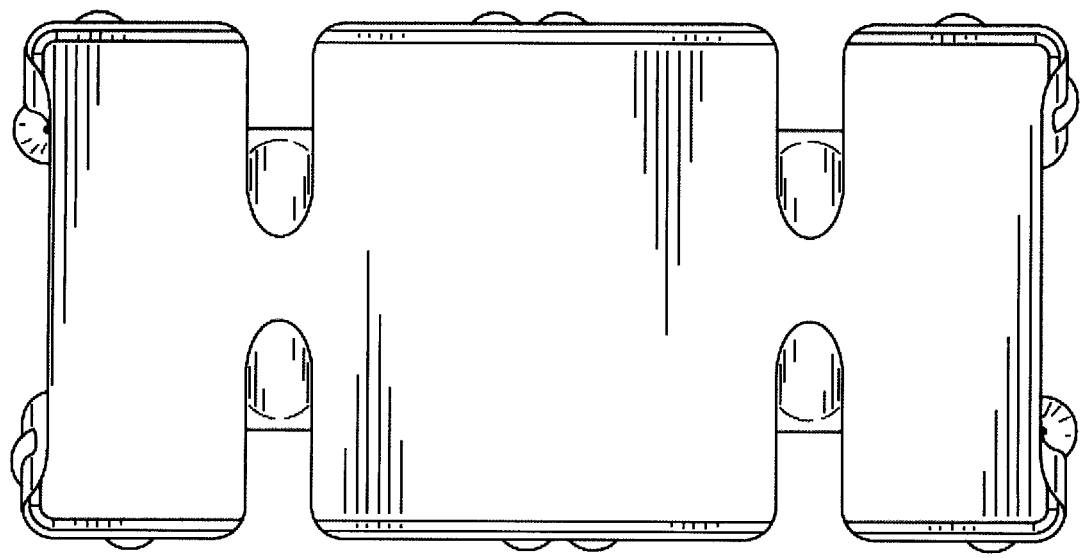
FIG. 35 is a plan view of a paving element according to another aspect.

FIG. 28A illustrates a paving element 1800 according to yet another aspect, wherein the paving element 1800 is designed to have two outer sides 1810, two inner sides 1812, and two face sides 1814, such that the paving element 1800 possesses an overall "L"-shaped outline when viewed from the top, similar to the paving element taught in U.S. Pat. No. 5,342,142. There are a plurality of partial cavities 1830A, each of which extends between an upper opening 1841A and a lower opening 1843A, wherein one set of openings 1843A is characterized having a quarter circle shape. There are also a plurality of partial cavities 1830B, each of which extends between an upper opening 1841B and a lower opening 1843B, wherein the lower opening 1843B is characterized by having a semicircular shape. Finally, there is at least one partial cavity 1830C which extends between an upper opening 1841C and a lower opening 1843C, wherein the lower opening 1843C is characterized by having a three-quarter circular shape. FIG. 28B shows a perspective view of the paving element 1800, and further illustrates the partial cavity 1830C which comprises a cupule portion 1832C and a conduit or channel portion 1834C, wherein the cupule portion 1832C is substantially concave such that the upper opening 1841C on the top surface 1813, has a larger diameter than the corresponding lower opening 1843C. Similarly, partial cavities 1832A and 1832B each comprise a substantially concave cupule portion and a conduit or channel portion, such that the upper opening 1841A and 1841B has a larger diameter than the corresponding lower opening 1843A and 1843B, respectively. According to this embodiment, a pavement system which comprises a plurality of pavement elements 1800 are arranged to form a pavement such that each partial cavity 1830A, 1830B, and 1830C on a paving element 1800 is joined with a corresponding partial cavity 1830C, 1830B, and 1830A, respectively, on an adjacent paving element 1800. More specifically, the corresponding partial cavity to any partial cavity 1843A, 1843B, or 1843C, is one that allows the resulting conduit opening to be a full circle.

Figure 37:
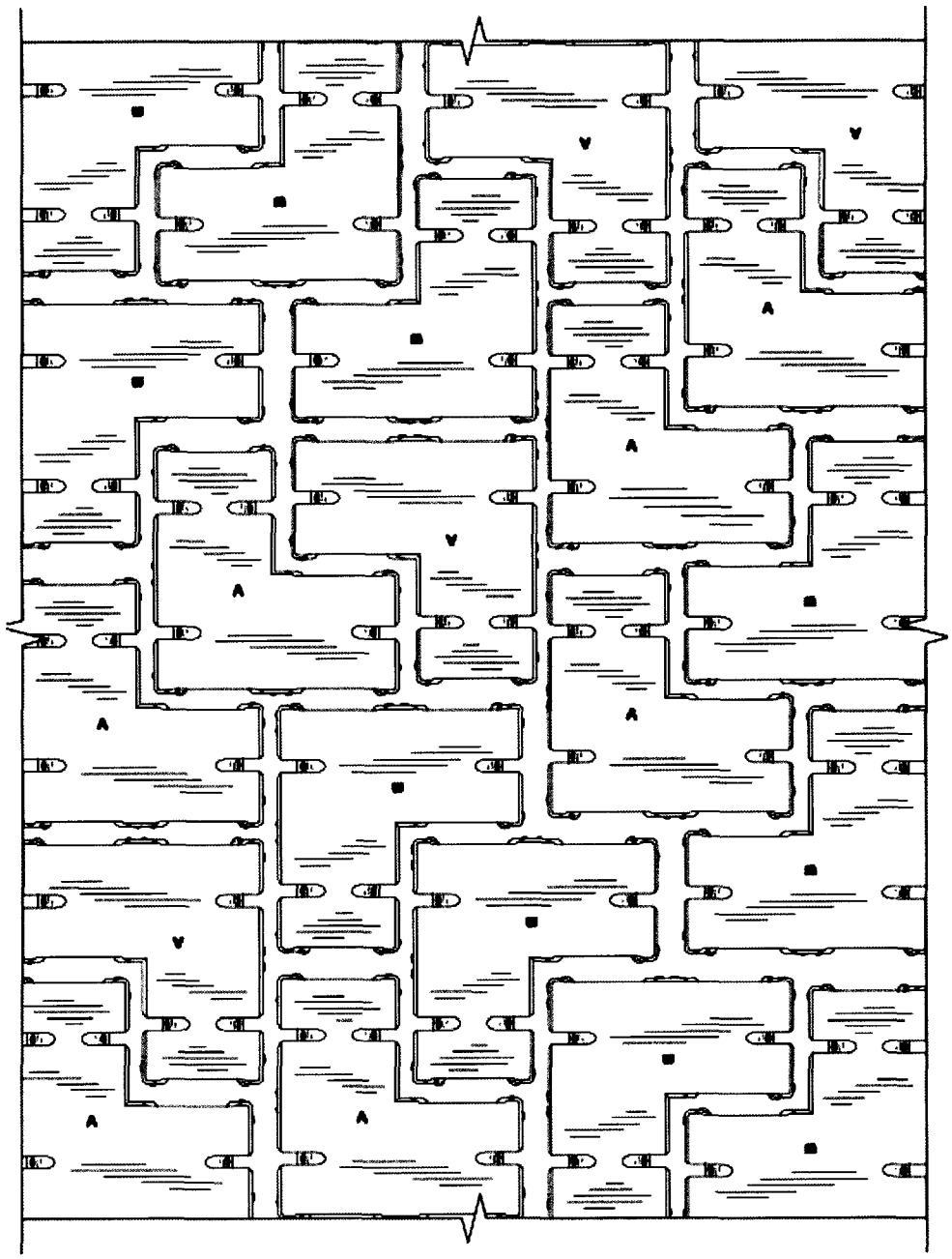
FIG. 37 is a plan view of an arrangement of paving elements shown in FIGS. 29 and 31.

Further aspects of the present paving stone are illustrated in FIGS. 29 to 36. FIGS. 29 to 32 illustrate "L" shaped stones according to this aspect and FIGS. 33 to 36 illustrate rectangular versions of stones according to this embodiment. As shown, the stones include a number of first partial cavities 1930a formed on the sides of the stones as well as second partial cavities 1930b formed as slots cut into one or more ends of the stones. The partial cavities 1930a are formed essentially parallel with the side of the stone on which they are provided and are defined by an upper, concave portion 1932a and lower portion 1934a. The partial cavities 1930b are formed essentially parallel with the side of the stone on which they are provided and are defined by an upper, concave portion 1932b and lower portion 1934b. When the stones are arranged on a surface to form a pavement, the adjacent first partial cavities 1930a combine to form complete cavities and adjacent, or abutting second partial cavities 1930b combined to form complete cavities. An example of such a pavement is illustrated in FIG. 37. As will be understood, although FIG. 37 illustrates a pavement using the stones of FIGS. 29 and 31, the stones of FIGS. 33 and 35 may also be arranged in a similar manner. In some cases, the "L" shaped stones may be combined with the rectangular shaped stones.

Figure 38:
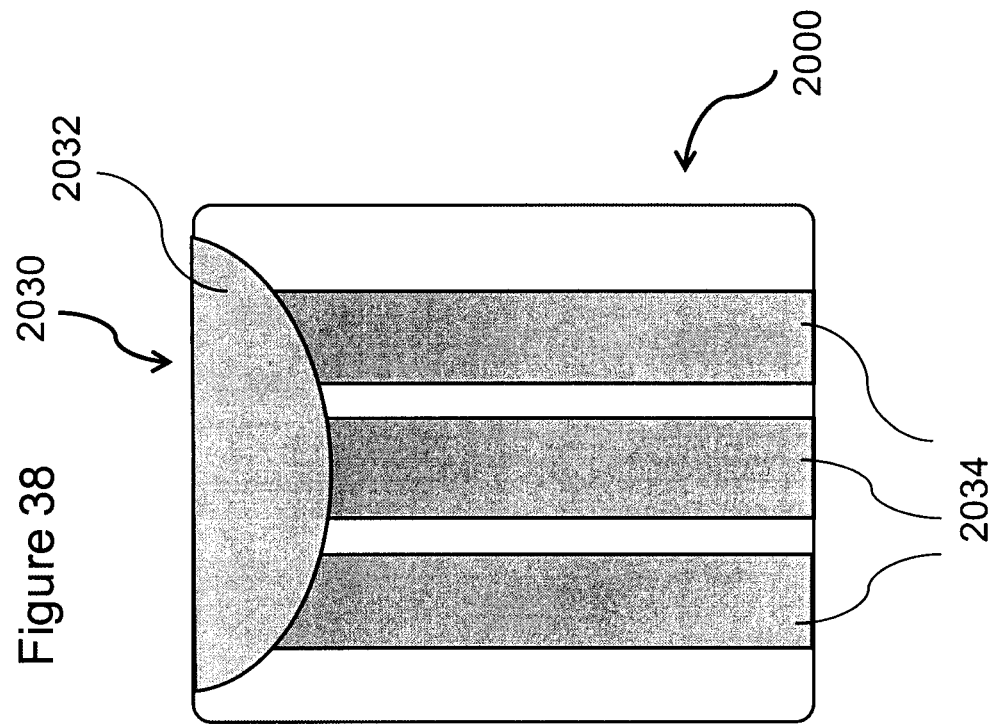
FIG. 38 is a front elevation of another aspect of a paving element.
Figure 39:
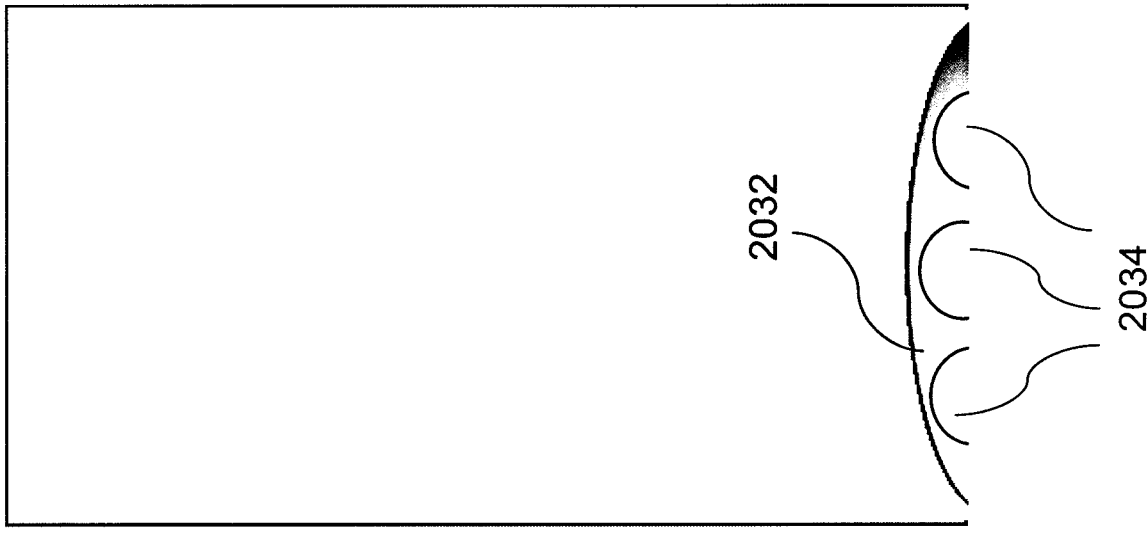
FIG. 39 is a plan view of the paving element of FIG. 38.

FIGS. 38 and 39 illustrate another embodiment of the subject paving stone 2000, where a partial cavity 2030 is formed in a similar manner as shown in FIG. 27. However, in the example of FIGS. 38 and 39, the partial cavity includes a more elongate upper portion 2032 that may extend along most of the length of the side of the paving stone on which the partial cavity is formed. In the version shown in FIGS. 38 and 39, the partial cavity 2030 is formed on a short side of a rectangular shaped paving stone 2000. It will be understood that such partial cavity can be formed on one or more sides of the paving stone 2000, including one or both of the short and/or long sides of a rectangular paving stone. It will also appreciated that a partial cavity as shown in FIGS. 38 and 39 may also be provided in paving stones of any shape, such as the "L" shaped stones of the present specification.

The partial cavity 2030 includes an upper convex portion 2032 and a plurality of lower portions 2034. In the version shown in FIGS. 38 and 39, three lower portions 2034 are shown, but it will be understood that any number of such portions can be provided.

FIG. 40 illustrates a version of the paving stone 2100 that is similar to that shown in FIGS. 38 and 39, but where the partial cavity 2130 is provided on one of the long sides of a rectangular shaped stone. As above, the partial cavity includes an upper, concave or cupule, portion 2132 and one or more lower portions 2134.

FIGS. 41 to 43 illustrate another version of a paving stone 2200 similar to that shown in FIGS. 38 and 39, but showing an example of a partial cavity having an upper, concave portion 2232 that extends completely along the length of the side of the paving stone 2200.

FIG. 44 illustrates another aspect of a paving stone 2300, wherein the concave portion 2332 of the partial cavity extends along the entire length of the side of the paving stone (as also shown in FIGS. 41 to 43), but where a single, elongate lower portion 2334 is provided.

FIGS. 45 and 46 illustrate another aspect of a paving stone 2400, wherein the partial cavity is formed at one or more of the corners of the stone. As shown, and as described above, each partial cavity is formed with an upper portion 2432 and a lower portion 2434. In this version, it will be understood that each stone would include a quarter portion of a complete cavity, whereby four stones, when arranged in a pavement, would combine to form a complete cavity.

In another aspect, a pavement system is provided. The pavement system comprises a plurality of paving elements, as described herein, positioned adjacent to one another. In forming such a pavement, the paving elements are laid adjacent each other in the known manner, but whereby respective openings are arranged together so as to form the aforementioned drainage openings over the pavement thus formed.

It is notable to mention that the cupules discussed herein are uniquely differentiable from the chamfered edges which are well known in the art and may be commonly found in paving elements. Solid 90 degree edges in paving blocks become weak points within a paving system—when two adjacent blocks are pressed together in such a system, the load is centered on the interface between the two blocks, which exerts force onto the upper edges and generally results in the pitting of the corners of the blocks. To address this issue, chamfered edges, which comprise symmetrical sloping surfaces at the joints at which two adjacent blocks meet, were designed and developed to help prevent such pitting of corners in pavement elements. By contrast, the various designs of the cupules discussed herein are not driven by the desire to prevent pitting of corners. The cupules are designed in such a way to facilitate cleaning of a pavement system and aid in substantially restoring the infiltration capacity of the system. Further, the cupules may be located at any edge and/or the interior portion of the pavement element. Thus, although the shapes resulting from chamfered edges in paving elements may in part resemble at least some of the cupule shapes discussed herein, it is evident that there are clear distinctions between the two.

While various aspects of the paving element have been described herein, in which one or more partial cavities are formed at the edge of the paving element, a cavity may also be formed at other portions of the paving element. For example, a full cavity may be formed in the interior portion of the element (i.e. away from the edges), such as at the center of the paving element. When paving elements having full cavities are laid adjacent to one another to form a paved surface, the full cavities formed in each of the elements act as the drainage cavity for allowing passage of liquid therethrough.

As will be understood, the shape and relative dimensions of the paving element may be varied. For example, the paving element may be square, rectangular, hexagonal, or multi-sided. The shape of the partial or full cavity may also be varied. For example, the partial or full cavity may be substantially circular, oblong, oval, or any other shape which would allow liquid to pass there-through to be filtered. It would also be understood that, in aspects wherein a plurality of partial or full drainage cavities are provided, each partial or full cavity may be shaped and/or configured to be identical to one another or may be different.

As discussed above, the structure of the drainage openings described herein comprise a concave, or cupule shaped opening or a planar, or triangular prism-like opening on the upper surface of the paving element and a generally cylindrical or rectangular conduit extending from the cupule and through the lower surface of the paving element, the conduit having a smaller diameter than the cupule portion. As discussed above, the structure of the opening on the upper surface of the paving element provides an advantage when cleaning the drainage channels. As will also be understood, by having a narrower conduit portion (as opposed to a conduit having the same diameter as the cupule opening) allows more solid material to be provided in the paving element. As can be appreciated, this allows the paving element to have a greater strength or integrity. In addition, with respect to drainage openings provided on the outer perimeter or sides of the paving elements, the added paving element material allows a greater contact area between adjacent paving elements when laid on a surface. The contact area may be between the adjacent paving elements directly or via the filler material provided there-between. In either case, the added contact area results in greater friction and, therefore, greater resistance to movement of the element, when laid to form a pavement. In addition, the increased surface area resulting from the narrower conduit portions allows for more spacer nibs or ribs to be provided on the paving elements, thereby further reducing the possibility of relative movement between adjacent paving elements.

In the present description, the conduit portion below the concave or cupule shaped opening has been described as being cylindrical or rectangular in shape, with a constant diameter along its length. However, it will be appreciated that such conduit may also have a conical shape, or partial conical shape in relation to drainage channels provided on the sides of the paving elements. Thus, the paving elements may be provided with conduits that are tapered, with diameters that increase either towards the upper or lower surfaces of the paving elements. Ideally, to accommodate production equipment, the conduits would taper upwards, with the upper diameter being greater than the lower diameter.

It will be understood that the cavities or partial cavities that have been described herein may be incorporated or formed into any shaped paving stones. The present description has described rectangular or "L" shaped stones for illustration. Although any of the cavity configurations can be incorporated into the described stones, they may also be incorporated into paving stones of any shape and also into any of the sides thereof.

Although the invention has been described with reference to certain specific aspects, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred aspects set forth in the above description, but should be given the broadest interpretation consistent with the present specification as a whole. The disclosures of all prior art recited herein are incorporated herein by reference in their entirety.

We claim:

1. A paving element comprising an upper surface, a lower surface and a side wall, the upper surface including a chamfer partially along its perimeter, the paving element further comprising one or more drainage channels extending between the upper and lower surfaces, wherein each of the drainage channels includes a first opening, provided at the upper surface of the paving element, and a second opening, provided on the lower surface of the paving element, the first opening having a concave portion extending downwardly from the upper surface of the paving element, wherein the first opening extends below the chamfer, the second opening including a conduit extending from a lower end of the first opening to the lower surface of the paving element, wherein the conduit has a smaller opening than the first opening, and wherein the one or more drainage channels are provided on a perimeter of the paving element.

2. The paving element of claim 1, wherein the drainage channels are partial channels, formed into the side wall of the paving element, wherein, when the paving element is in use, the partial channels are adapted to cooperate with partial channels of an adjacent paving element to form complete channels when the paving elements are positioned together to form a pavement.

3. The paving element of claim 1, wherein each of the concave portions of the drainage channels is symmetrical with respect to at least one axis of the paving element.

4. The paving element of claim 1, wherein each of the concave portions of the drainage channels is asymmetrical with respect to at least one axis of the paving element.

5. The paving element of claim 1, wherein the concave portions are round, oval, elongate or elliptical in shape.

6. The paving element of claim 1, wherein each of the concave portions is oriented at an angle with respect to the plane of the upper surface of the paving element.

7. The paving element of claim 1, wherein the one or more drainage channels are provided on one or more corners of the paving element.

8. The paving element of claim 1 further comprising a plurality of spacer ribs or nibs provided on the side wall.

9. A pavement system comprising a plurality of paving elements according to claim 1, each of the paving elements being adapted to be laid adjacent each other.

10. The paving element of claim 1, wherein at least one of the drainage channels includes a filter medium adapted to filter liquid passing through the channel.

11. The paving element of claim 10, wherein the filter medium is removable from the drainage channel.

12. A paving element comprising an upper surface, a lower surface and a side wall, the upper surface including a chamfer partially along its perimeter, the paving element further comprising a plurality of drainage channels extending through the element between the upper and lower surfaces, wherein each of the drainage channels includes a first opening, provided on the upper surface of the paving element, and a second opening, provided on the lower surface of the paving element, the first opening having a substantially planar portion extending down from the upper surface of the paving element, wherein the first opening extends below the chamfer, the second opening including a conduit extending from a lower end of the first opening to the lower surface of the paving element, wherein the conduit has a smaller opening than the first opening, and wherein the one or more drainage channels are provided on a perimeter of the paving element.

13. The paving element of claim 12, wherein the drainage channels provided on the perimeter are partial channels, formed into the side wall, wherein, when the paving element is in use, the partial channels are adapted to cooperate with partial channels of an adjacent paving element to form complete channels.

14. The paving element of claim 12, wherein each of the planar portions of the drainage channels is symmetrical with respect to at least one axis of the paving element.

15. The paving element of claim 12, wherein each of the planar portions of the drainage channels is asymmetrical with respect to at least one axis of the paving element.

16. The paving element of claim 12, wherein each of the planar portions is oriented at an angle with respect to the plane of the upper surface of the paving element.

17. The paving element of claim 12 further comprising a plurality of spacer ribs or nibs provided on the side wall.

18. The paving element of claim 12, wherein at least one of the drainage channels includes a filter medium adapted to filter liquid passing through the channel.

19. The paving element of claim 18, wherein the filter medium is removable from the drainage channel.

20. A pavement system comprising a plurality of paving elements according to claim 8, each of the paving elements being adapted to be laid adjacent each other.

* * * * *